United States Patent
Muta et al.

(10) Patent No.: US 8,383,278 B2
(45) Date of Patent: Feb. 26, 2013

(54) FUEL CELL SYSTEM AND OPERATING METHOD THEREOF

(75) Inventors: Aoi Muta, Osaka (JP); Yoichiro Tsuji, Osaka (JP); Miho Gemba, Osaka (JP)

(73) Assignee: Panasonic Corporation, Osaka (JP)

( * ) Notice: Subject to any disclaimer, the term of this patent is extended or adjusted under 35 U.S.C. 154(b) by 499 days.

(21) Appl. No.: 12/531,583

(22) PCT Filed: Apr. 9, 2008

(86) PCT No.: PCT/JP2008/000915
§ 371 (c)(1),
(2), (4) Date: Sep. 16, 2009

(87) PCT Pub. No.: WO2008/132783
PCT Pub. Date: Nov. 6, 2008

(65) Prior Publication Data
US 2010/0104908 A1    Apr. 29, 2010

(30) Foreign Application Priority Data
Apr. 18, 2007    (JP) .................................. 2007-108986

(51) Int. Cl.
*H01M 8/04* (2006.01)
(52) U.S. Cl. .......................................... 429/429
(58) Field of Classification Search ............ 429/434, 429/429
See application file for complete search history.

(56) References Cited

U.S. PATENT DOCUMENTS
2004/0146761 A1* 7/2004 Cargnelli et al. ............... 429/22
2004/0180248 A1* 9/2004 Matsubayashi et al. ........ 429/26
2006/0251943 A1* 11/2006 Hatoh et al. .................... 429/32
2007/0003805 A1 1/2007 Sugawara et al.
2007/0099040 A1 5/2007 Morita et al.

FOREIGN PATENT DOCUMENTS
| JP | 04-502749 | | 5/1992 |
| JP | 06-251788 | * | 9/1994 |
| JP | 2002-280029 | | 9/2002 |
| JP | 2003-178780 | * | 6/2003 |
| JP | 2004-006166 | | 1/2004 |
| JP | 2004-163037 | | 6/2004 |

(Continued)

*Primary Examiner* — Ula C Ruddock
*Assistant Examiner* — Frank Chernow
(74) *Attorney, Agent, or Firm* — McDermott Will & Emery LLP

(57) ABSTRACT

In order to provide a fuel cell system (which ensures high proton conductivity and high energy conversion efficiency and, in addition, copes with an operating mode of the startup/shutdown type and which has excellent durability capable of effectively preventing a polymer electrolyte membrane from deterioration) and an operating method of such a fuel cell system, a fuel cell system (100) is provided with a fuel cell (11), a fuel gas supplier (16) and an oxidizing gas supplier (17), a temperature supplier (19) which controls the temperature of the fuel cell, and a humidifier unit (18) which humidifies oxidizing gas, wherein there is further provided a controller (20) which controls the dew point of fuel gas and the dew point of oxidizing gas as follow: during the generation of electric power, the fuel gas dew point is made higher than or equal to the temperature of the fuel cell while the oxidizing gas dew point is made less than the temperature of the fuel cell and, before interrupting the electric connection between the fuel cell and a load, at least, the temperature of the fuel cell and the oxidizing gas dew point are made to conform to each other.

11 Claims, 12 Drawing Sheets

FOREIGN PATENT DOCUMENTS

| | | | |
|---|---|---|---|
| JP | 2004-165037 | * | 6/2004 |
| JP | 2004-296384 | | 10/2004 |
| JP | 2004-363027 | | 12/2004 |
| JP | 2005-025996 | | 1/2005 |
| JP | 2005-209362 | | 8/2005 |
| WO | WO 91/00254 | | 1/1991 |
| WO | WO 2007/046483 A1 | | 4/2007 |

* cited by examiner

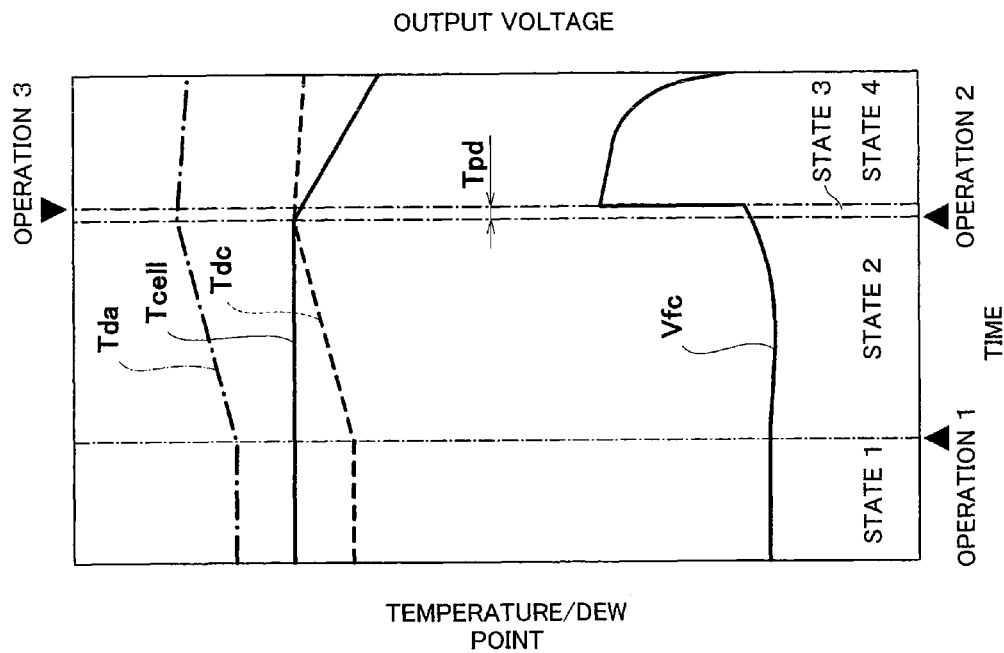
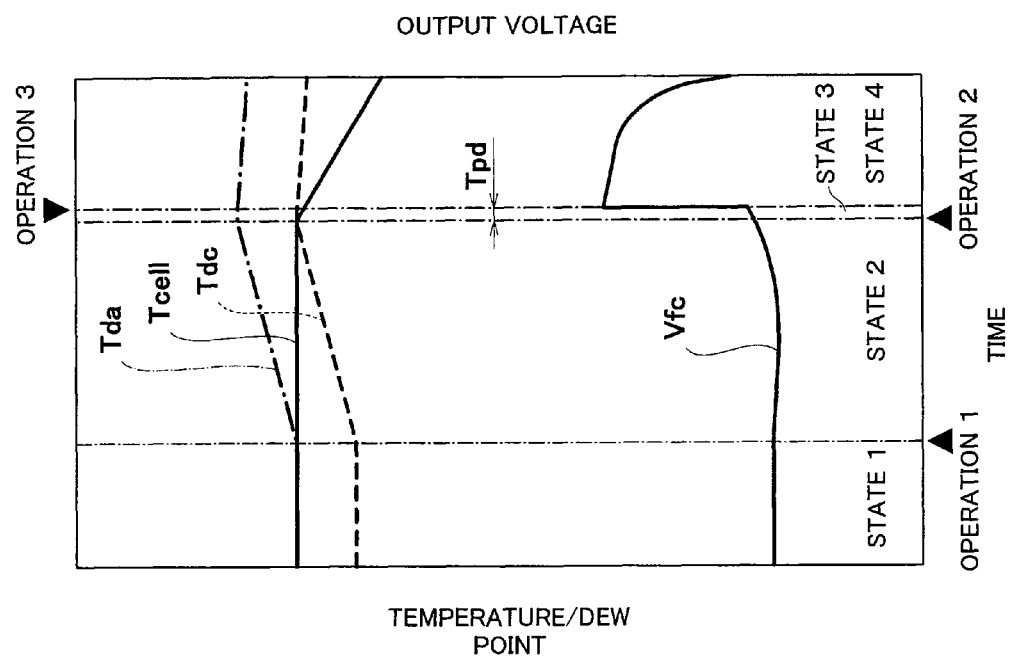

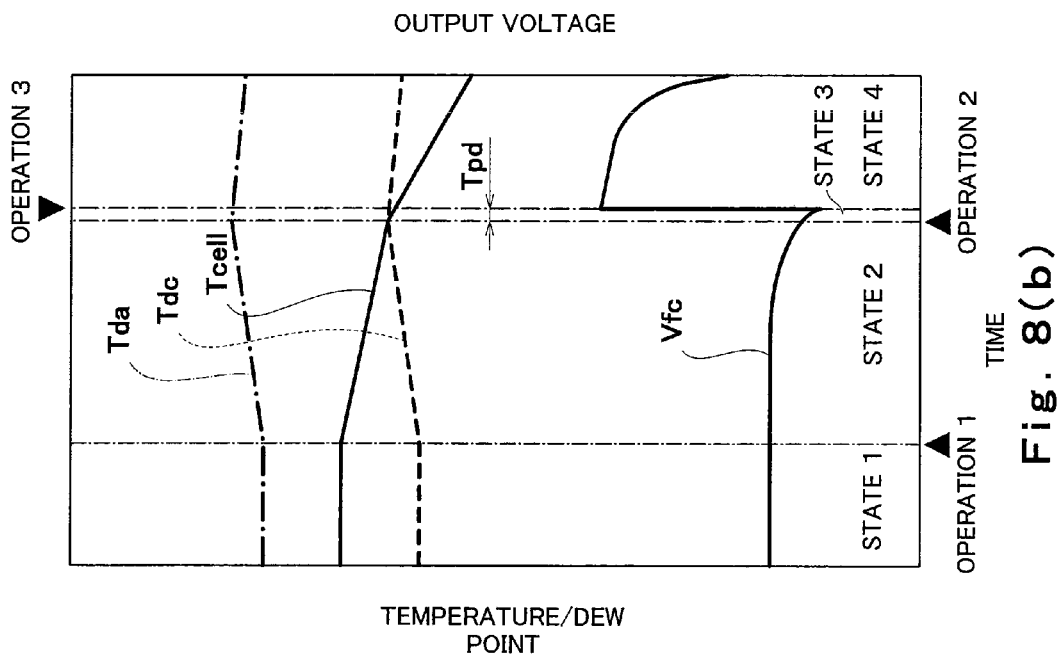
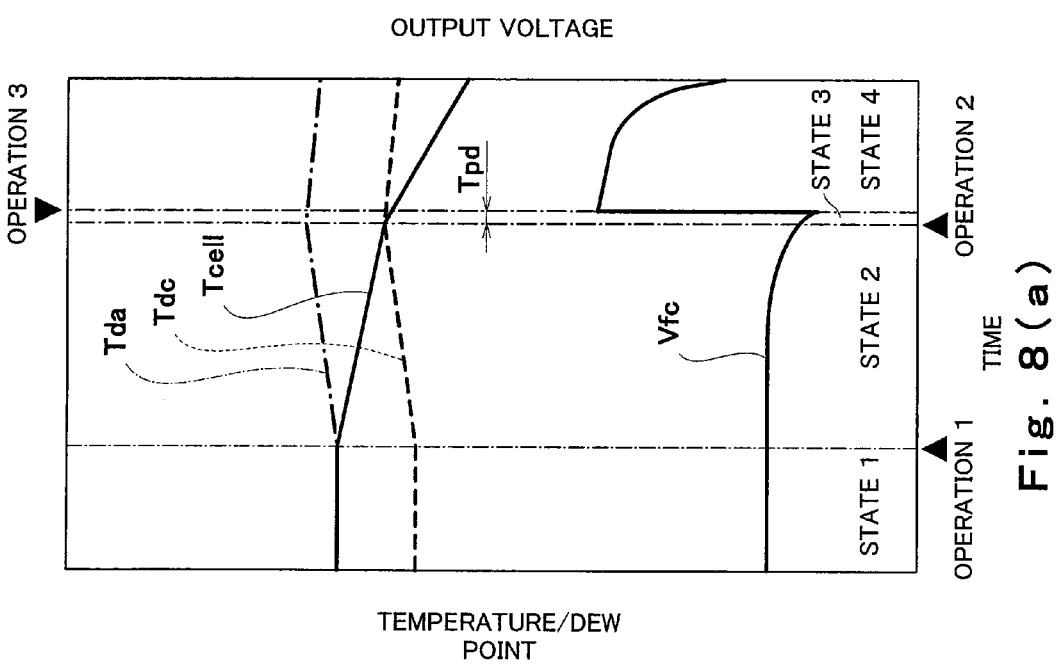

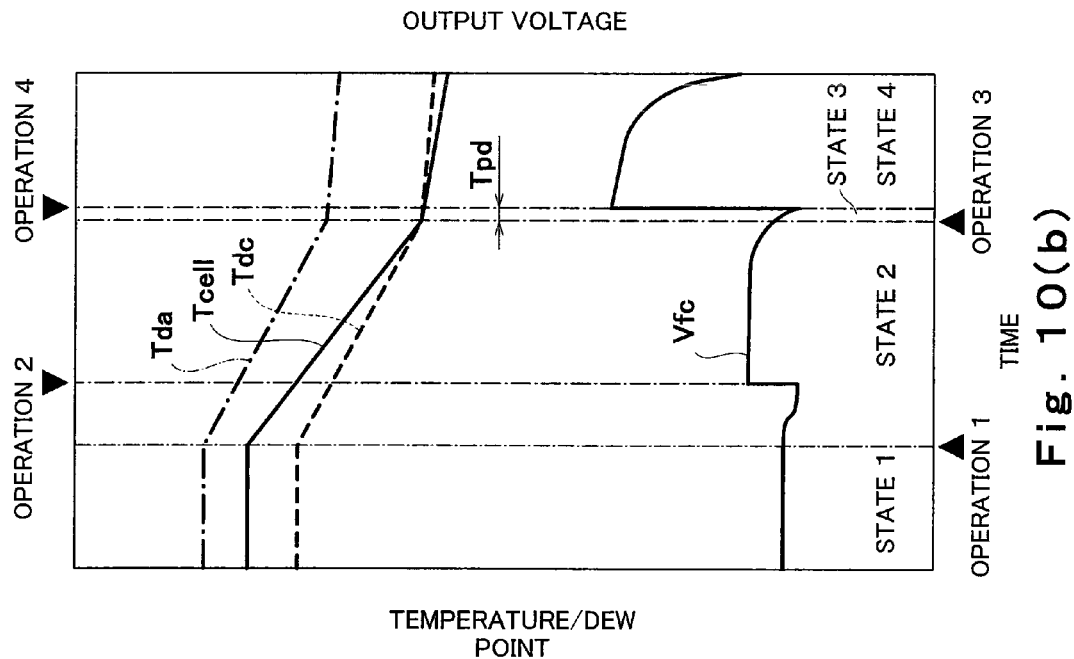
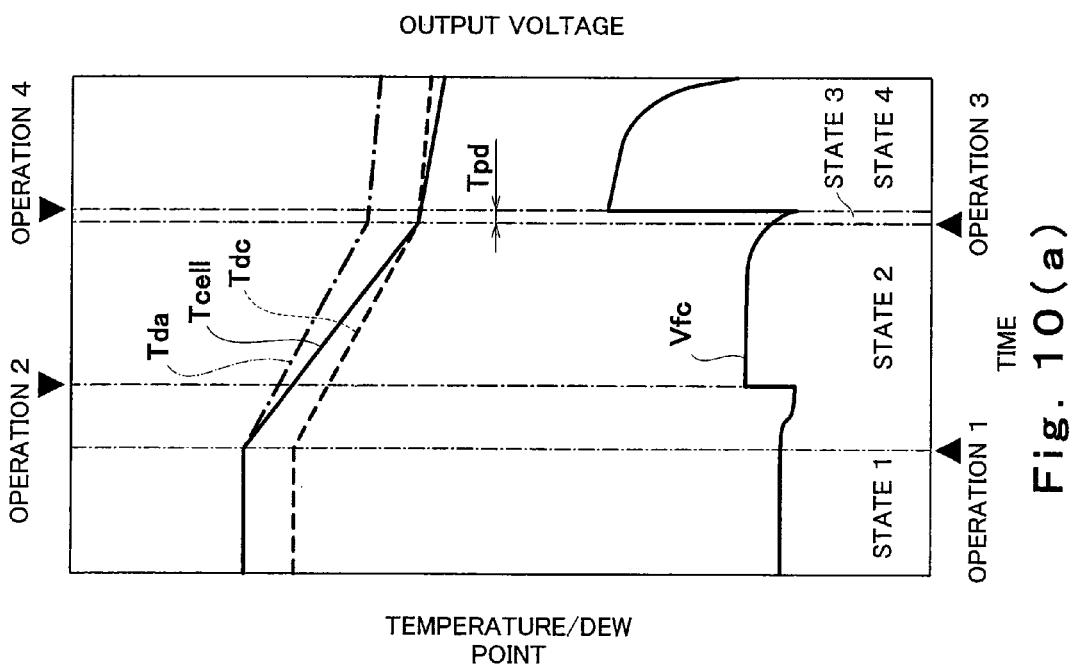

FUEL CELL SYSTEM AND OPERATING METHOD THEREOF

RELATED APPLICATIONS

This application is the U.S. National Phase under 35 U.S.C. §371 of International Application No. PCT/JP2008/000915, filed on Apr. 9, 2008, which in turn claims the benefit of Japanese Application No. 2007-108986, filed on Apr. 18, 2007, the disclosures of which Applications are incorporated by reference herein.

TECHNICAL FIELD

The present invention relates to a fuel cell system which generates electric power using hydrogen-containing fuel gas and oxygen-containing oxidizing gas. This invention relates also to an operating method of such a fuel cell system.

BACKGROUND ART

A fuel cell system capable of small-scale electric power generation at high efficiency has been developed as an electric power generating system of the distributed type capable of implementing high energy-use efficiency because it is easy to construct a system for making utilization of heat energy produced when electric power is generated.

A fuel cell system includes, as a main body of its electric power generating section, a fuel cell. As such a fuel cell, for example, a phosphoric acid fuel cell, a molten carbonate fuel cell, an alkali aqueous solution fuel cell, a polymer electrolyte fuel cell, or other like fuel cell is employed. Of these types of fuel cells, the polymer electrolyte fuel cell is characterized by its ability to generate electric power at relatively low temperatures (from about 50 to about 120 degrees Centigrade) and by its high output density and long service life. Therefore, the polymer electrolyte fuel cell is expected to be applied to electric vehicle's motive electric power sources which are required to have a high output characteristic and a quick startup, to cogeneration systems for household use which are required to have a long-term reliability, or to other like system.

In a polymer electrolyte fuel cell, during its operation of generating electric power, hydrogen-containing fuel gas is supplied towards an anode while on the other hand oxygen-containing oxidizing gas is supplied towards a cathode. As a result, in the anode of the polymer electrolyte fuel cell, hydrogen supplied is converted into electrons and protons. The electrons generated in the anode will reach the cathode of the polymer electrolyte fuel cell by way of an external load connected to the fuel cell system. On the other hand, the protons generated in the anode will reach the cathode through a polymer electrolyte membrane. Meanwhile, in the cathode of the polymer electrolyte fuel cell, water is generated from incoming electrons arriving by way of the external load, incoming protons arriving through the polymer electrolyte membrane, and oxygen present in the oxidizing gas supplied to the cathode. By such a series of mechanisms, electric power is outputted from the polymer electrolyte fuel cell, whereby the external load is driven. Furthermore, fuel gas is supplied from a fuel gas supplier which generates hydrogen, for example, from methane by a steam reforming reaction. In addition, oxidizing gas is supplied from an oxidizing gas supplier which takes in air from the atmosphere, for example, by means of a "sirocco" fan.

Incidentally, in a fuel cell system equipped with a polymer electrolyte fuel cell, it is required that its polymer electrolyte membrane be maintained in a wet condition in order to ensure proton conductivity from the anode side to the cathode side. To this end, in the fuel cell system, fuel gas humidified and oxidizing gas humidified are supplied to the anode side and to the cathode side, respectively. In addition, in the fuel cell system, in order to ensure high energy conversion efficiency when converting a change in the free energy of a chemical reaction into electric energy, the polymer electrolyte fuel cell is operated, for example, in an operating condition that meets the following interrelations: Tcell>Tda and Tcell>Tdc (hereinafter, such an operating condition is referred to as a "low-humidification operating condition") where Tda is the fuel gas dew point, Tdc is the oxidizing gas dew point, and Tcell is the polymer electrolyte fuel cell temperature. Hereby, the fuel cell system will stably exhibit its predefined electric power generation performance over long periods (for example, see Patent Document 1).

On the other hand, the electric power generating operation of the fuel cell system generally employs such a startup/shutdown type operating mode that the electric power generating operation of the polymer electrolyte fuel cell is started up or shut down depending on the situation, because there is no need to carry out an operation of producing electric power if neither electric energy nor heat energy that the fuel cell system generates is needed. In this startup/shutdown type operating mode, when neither electric energy nor heat energy is required the controller of the fuel cell system first controls the fuel gas supplier and the oxidizing gas supplier to stop their operation and then disconnects the electric connection between the polymer electrolyte fuel cell and the external load. Hereby, the polymer electrolyte fuel cell enters the open circuit state. And in order to prevent the polymer electrolyte membrane from becoming dried, the controller causes humidified inactive gas to be sealed within the inside of the polymer electrolyte fuel cell. In addition, the controller shuts off the connection of the polymer electrolyte fuel cell with the fuel gas supplier and the oxidizing gas supplier, thereby closing off a fuel gas passage and an oxidizing gas passage in the polymer electrolyte fuel cell. Hereby, the fuel cell system prevents the polymer electrolyte membrane from becoming dried over long periods (for example, see Patent Documents 2, 3, and 4).

Patent Document 1: JP-A-H04-502749
Patent Document 2: JP-A-H06-251788
Patent Document 3: JP-A-2004-163037
Patent Document 4: JP-A-2004-006166

DISCLOSURE OF THE INVENTION

Problems to be Solved by the Invention

However, although in the above-described conventional fuel cell system the drying of the polymer electrolyte membrane is prevented over long periods by the sealing-in of humidified inactive gas or the closing-off of the fuel gas passage and the oxidizing gas passage, there is still the problem that the deterioration of the polymer electrolyte membrane increases with time, thereby causing the performance of generating electric power of the polymer electrolyte fuel cell to decrease with time. The cause of this problem is that, when stopping the electric power generating operation of the fuel cell system, the polymer electrolyte fuel cell in operation in a low-humidification operating condition is electrically disconnected from the external load and is placed in the open circuit state.

In addition, in this conventional fuel cell system, damage, such as breakage, to the polymer electrolyte membrane increases with the increase in the number of times the polymer electrolyte fuel cell is started up/shut down, thereby causing the problem that the performance of generating electric power of the polymer electrolyte fuel cell decreases with time. The cause for this is that, since the low-humidification operation during the electric power generating operation and the sealing-in of humidified inactive gas after the electric power generating operation are repeatedly carried out, the polymer electrolyte membrane repeatedly undergoes swelling and contraction, thereby causing stress to concentrate in a part of the polymer electrolyte membrane.

The present invention was made with a view to providing solutions to the problems associated with the prior art techniques. Accordingly, an object of the present invention is to provide a fuel cell system (which ensures enough proton conductivity and enough energy conversion efficiency and, in addition, copes with an operating mode of the startup/shutdown type and which has excellent durability capable of effectively preventing a polymer electrolyte membrane from deterioration), and an operating method of such a fuel cell system.

Means for Solving the Problems

Through a series of their research efforts dedicated to accomplishing the said object, the inventors of the present application attained to the present invention from their discovery that it is possible to definitely ensure proton conductivity from the side of an anode to the side of a cathode in a polymer electrolyte fuel cell and energy conversion efficiency when obtaining electric energy if the polymer electrolyte fuel cell is operated in "a proper low-humidification operating condition" differing slightly from the foregoing low-humidification operating condition, without having to operate the polymer electrolyte fuel cell in the low-humidification operating condition: Tcell>Tda and Tcell>Tdc.

In addition, based on the fact that, when the fuel cell system is operated in a low-humidification operating condition, the deterioration of the polymer electrolyte membrane caused by drying tends to increase especially when bringing the electric power generating operation to a stop from the state in which the fuel cell system is being operated in such a low-humidification operating condition, the inventors of the present application attained to the present invention from their discovery that it is extremely effective to accomplish the said object that, before stopping the discharge of electric power of the polymer electrolyte fuel cell, the amount of water content of the polymer electrolyte membrane is properly adjusted while maintaining the output voltage of the polymer electrolyte fuel cell to fall within a predetermined range lower than the open circuit voltage.

That is, the present invention provides a fuel cell system which comprises: a fuel cell which generates electric power using hydrogen-containing fuel gas and oxygen-containing oxidizing gas; a fuel gas supplier which supplies the fuel gas to the fuel cell; an oxidizing gas supplier which supplies the oxidizing gas to the fuel cell; and a controller configured to control at least the fuel cell, the fuel gas supplier, and the oxidizing gas supplier, wherein the fuel cell system further comprises a temperature controller configured to control a temperature of the fuel cell and at least one humidifier that humidifies either one of the fuel gas and the oxidizing gas which are supplied to the fuel cell; wherein, during an electric power generation period of the fuel cell, the controller controls at least either one of the temperature controller and the humidifier so that either one of a dew point of the fuel gas and a dew point of the oxidizing gas is made higher than or equal to the temperature of the fuel cell while the other dew point is made lower than the temperature of the fuel cell; and wherein, thereafter, before interrupting an electrical connection between the fuel cell and a load, the controller controls at least either one of the temperature controller and the humidifier so that, at least, the temperature of the fuel cell and the other dew point conform to each other, after which the controller interrupts the electrical connection between the fuel cell and the load.

In addition, the present invention provides an operating method for a fuel cell system, the fuel cell system comprising: a fuel cell which generates electric power using hydrogen-containing fuel gas and oxygen-containing oxidizing gas; a fuel gas supplier which supplies the fuel gas to the fuel cell; and an oxidizing gas supplier which supplies the oxidizing gas to the fuel cell, the fuel cell system operating method comprising: during an electric power generation period of the fuel cell, causing either one of the dew point of the fuel gas and the dew point of the oxidizing gas to be higher than or equal to the temperature of the fuel cell and causing the other dew point to be lower than the temperature of the fuel cell; and, thereafter, before interrupting an electrical connection between the fuel cell and a load, at least causing the temperature of the fuel cell and the other dew point to conform to each other, and thereafter interrupting the electrical connection between the fuel cell and the load.

In such a configuration, during the electric power generation of the fuel cell system, either one of the dew point of the fuel gas and the dew point of the oxidizing gas is made higher than or equal to the temperature of the fuel cell while the other dew point is made less than the temperature of the fuel cell, whereby the repetition between swelling and contraction in the polymer electrolyte membrane is considerably suppressed, thereby making it possible to effectively suppress the concentration of stress in a part of the polymer electrolyte membrane.

In addition, in the process of shifting the state of the fuel cell system from an electric power generation state to an electric power generation stopping state, the controller controls at least either one of the temperature controller and the humidifier so that the electric connection between the fuel cell and the load is interrupted after the temperature of the fuel cell is made to conform to at least either the dew point of the fuel gas or the dew point of the oxidizing gas, whichever is lower than the other, whereby it becomes possible to relatively increase the amount of water content of the polymer electrolyte membrane.

And, this makes it possible to suppress the deterioration of the polymer electrolyte membrane, and it becomes possible to provide a fuel cell system which is excellent in durability.

In this case, in the fuel cell system according to the present invention, before interrupting the electric connection between the fuel cell and the load, the controller controls at least either one of the temperature controller and the humidifier so that the other dew point is made higher than or equal to the temperature of the fuel cell.

In addition, in this case, the operating method of the fuel cell system according to the present invention, may further comprise: before interrupting the electric connection between the fuel cell and the load, causing the other dew point to be higher than or equal to the temperature of the fuel cell.

In such a configuration, the polymer electrolyte membrane is sufficiently humidified. This makes it possible to suppress the deterioration of the polymer electrolyte membrane, and it becomes possible to definitely ensure the durability of the fuel cell.

In this case, in the fuel cell system according to the present invention, the controller controls the temperature controller to decrease the temperature of the fuel cell so that the temperature of the fuel cell conforms to the other dew point.

In addition, in this case, the operating method of the fuel cell system according to the present invention, may further comprise: decreasing the temperature of the fuel cell so that the temperature of the fuel cell and the other dew point conform to each other.

In such a configuration, it becomes possible that the temperature of the fuel cell and the other of the dew points of the fuel gas and the oxidizing gas readily conform to each other.

In the above case, in the fuel cell system according to the present invention, at the time of the said fuel cell temperature decrease, the controller controls an output electric current density of the fuel cell to be less than or equal to an output electric current density during the said electric power generation period.

In addition, in the above case, the operating method of the fuel cell system according to the present invention, may further comprise: at the time of the said fuel cell temperature decrease, controlling an output electric current density of the fuel cell to be less than or equal to an output electric current density during the electric power generation period.

In such a configuration, the output electric current density of the fuel cell is controlled to be less than or equal to that during the generation of electric power when decreasing the temperature of the fuel cell, whereby it becomes possible to suppress the amount of generation of water generated associated with the generation of electric power. This makes it possible to prevent the occurrence of passage blockage in the fuel cell.

In this case, in the fuel cell system according to the present invention, the controller controls at least either one of a flow rate of and a temperature of cooling medium within the temperature controller to decrease the temperature of the fuel cell.

In such a configuration, at least either one of the flow rate of and the temperature of cooling medium within the temperature controller is controlled, thereby making it possible that the temperature of the fuel cell can be readily decreased.

In addition, in the above case, in the fuel cell system according to the present invention, the controller controls the humidifier to increase at least either one of the dew point of the fuel gas and the dew point of the oxidising gas so that the temperature of the fuel cell and the other dew point conform to each other.

In addition, in the above case, the operating method of the fuel cell system according to the present invention may further comprise: increasing at least either one of the dew point of the fuel gas and the dew point of the oxidising gas so that the temperature of the fuel cell and the other dew point conform to each other.

In such a configuration, it also becomes possible that the temperature of the fuel cell and the other of the dew points of the fuel gas and the oxidizing gas readily conform to each other.

In this case, in the fuel cell system according to the present invention, at the time of the said dew point increase, the controller controls an output electric current density of the fuel cell to be less than or equal to an output electric current density during the said electric power generation period.

In addition, in the above case, the operating method of the fuel cell system according to the present invention, may further comprise: controlling at the time of the said dew point increase, the output electric current density of the fuel cell to be less than or equal to an output electric current density during the said electric power generation period.

In such a configuration, the output electric current density of the fuel cell is controlled so as to be less than or equal to that during the generation of electric power when increasing at least either one of the dew point of the fuel gas and the dew point of the oxidizing gas, whereby it becomes possible to suppress the amount of generation of water generated associated with the generation of electric power. This makes it possible to prevent the occurrence of passage blockage in the fuel cell.

In the above-described case, in the fuel cell system according to the present invention, the controller controls a temperature of a humidifier unit in the humidifier by means of at least either one of the flow rate of and the temperature of at least either one of the fuel gas and the oxidizing gas so that at least either one of the dew point of the fuel gas and the dew point of the oxidizing gas increases.

In such a configuration, the temperature of the humidifier unit of the humidifier is controlled by means of at least either one of the flow rate of and the temperature of at least either one of the fuel gas and the oxidizing gas, whereby it becomes possible that at least either the dew point of the fuel gas or the dew point of the oxidizing gas can be readily increased.

Effects of the Invention

The present invention, configured in the way as described above, provides a fuel cell system (which ensures high enough proton conductivity and energy conversion efficiency and, in addition, copes with an operating mode of the startup/shutdown type and which has excellent durability capable of effectively preventing a polymer electrolyte membrane from deterioration), and an operating method of such a fuel cell system.

BRIEF DESCRIPTION OF THE DRAWINGS

FIG. 6 is a time chart schematically representing temporal variations of the fuel cell temperature Tcell, the fuel gas dew point Tda, the oxidizing gas dew point Tdc, and the fuel cell output voltage Vfc in a characteristic operation of the fuel cell system according to the second embodiment of the present invention.

FIG. 8 is a time chart schematically representing temporal variations of the fuel cell temperature Tcell, the fuel gas dew point Tda, the oxidizing gas dew point Tdc, and the fuel cell output voltage Vfc in a characteristic operation of a fuel cell system according to a third embodiment of the present invention.

FIG. 10 is a time chart schematically representing temporal variations of the fuel cell temperature Tcell, the fuel gas dew point Tda, the oxidizing gas dew point Tdc, and the fuel cell output voltage Vfc in a characteristic operation of a fuel cell system according to a fourth embodiment of the present invention.

Figure 1:
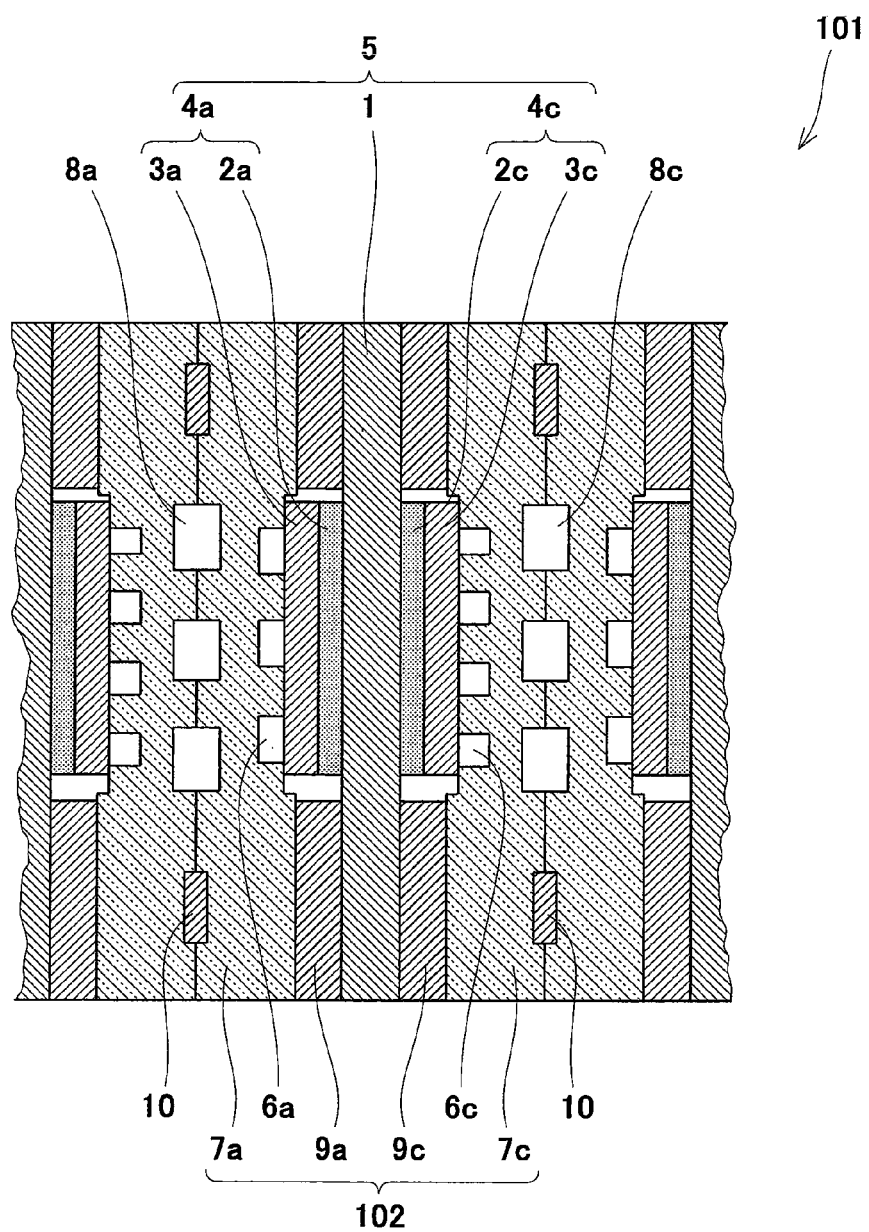
FIG. 1 is a cross sectional view schematically illustrating a cross sectional construction of a fuel cell of a fuel cell system according to a first embodiment of the present invention.

EXPLANATION OF REFERENCE NUMERALS 1 polymer electrolyte membrane
2a, 2c catalytic reaction layer
3a, 3c gas diffusion layer
4a anode
4c cathode
5 MEA (membrane/electrode assembly)
6a fuel gas passage
6c oxidizing gas passage
7a, 7c separator
8a, 8c cooling water passage
9a, 9c gasket
10 gasket
11 fuel cell (polymer electrolyte fuel cell)
12 fuel gas supply unit
13 oxidizing gas supply unit
14 fuel gas discharge unit
15 oxidizing gas discharge unit
16 fuel gas supplier
17 oxidizing gas supplier
18 humidifier unit
18a, 18c humidifier unit
19 temperature controller
20 controller
21a, 21c dew point sensor
22 temperature sensor
23 controller
24 dew point controller
25 three-way valve
101 fuel cell (principal part)
102 electric cell (cell)
100, 200 fuel cell system

BEST MODE FOR CARRYING OUT THE INVENTION

Hereinafter, with reference to the drawings, a description will be made in detail about a best mode for carrying out the present invention. Furthermore, in the following description, a polymer electrolyte fuel cell system equipped with a polymer electrolyte fuel cell is referred to simply as a "fuel cell system". In addition, in the following description, a polymer electrolyte fuel cell is referred to simply as a "fuel cell". Moreover, in the following description, a membrane/electrode assembly is referred to simply as an "MEA".

First Embodiment

In the first place, a configuration of a fuel cell system according to a first embodiment of the present invention will be described with reference to FIGS. 1 and 2.

FIG. 1 is a cross sectional view schematically illustrating a cross sectional construction of a fuel cell of the fuel cell system of the first embodiment of the present invention. Note that in FIG. 1 only a principal section of the fuel cell is selected for diagrammatic representation, with a view to providing a clear understanding of the basic configuration of the fuel cell.

As shown in FIG. 1, in a fuel cell 101 according to the present embodiment, an MEA 5 including a pair of gaskets 9a and 9c arranged on the periphery thereof is sandwiched between a pair of separators 7a and 7c. Hereby, an electric cell 102 (which is hereinafter referred to as the "cell") is formed in the fuel cell 101 of the present embodiment. And the fuel cell 101 is formed of a plurality of such cells 102 that are stacked in series on upon the other.

Going into details, the MEA 5 includes a polymer electrolyte membrane 1 which is proton conductive, as shown in FIG. 1. The polymer electrolyte membrane 1, in a moisture state, selectively transports protons. This proton transport ability of the polymer electrolyte membrane 1 is implemented as follows. That is, a fixed charge (which is fixed to the polymer electrolyte membrane 1 in the moisture state) electrolytically dissociates and hydrogen that functions as a counter ion for the fixed charge ionizes to become movable. And, as illustrated in FIG. 1, a catalytic reaction layer 2a and a catalytic reaction layer 2b, each of which is formed mainly of carbon powders and supports thereon a metallic catalyst of the platinum family, are mounted respectively onto the central parts of both surfaces of the polymer electrolyte membrane 1 so that they are situated face to face with each other. Here, in one of the catalytic reaction layers 2a and 2c, i.e., in the catalytic reaction layer 2a, hydrogen derived from fuel gas supplied from a fuel gas supplier (not shown in FIG. 1) is converted into electrons and protons as shown in chemical formula (1). Electrons produced in the catalytic reaction layer 2a reaches, by way of an external load (not shown in FIG. 1), the catalytic reaction layer 2c. On the other hand, protons produced in the catalytic reaction layer 2a passes through the polymer electrolyte membrane 1 and reaches the catalytic reaction layer 2c. Meanwhile, in the catalytic reaction layer 2c of the fuel cell 101, electrons arriving by way of the external load, protons arriving through the polymer electrolyte membrane 1, and oxygen derived from oxidizing gas supplied from an oxidizing gas supplier (not shown in FIG. 1) are utilized to form water as shown in chemical formula (2). Through this series of chemical reactions, the fuel cell 101 outputs electric power and, in addition, produces heat.

  chemical formula (1)

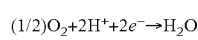  chemical formula (2)

In addition, as shown in FIG. 1, a gas diffusion layer 3a and a gas diffusion layer 3c are mounted respectively onto surfaces of the catalytic reaction layers 2a and 2c (which surfaces are not in contact with the polymer electrolyte membrane 1) so that these diffusion layers are situated face to face with each other. These gas diffusion layers 3a and 3c combine both permeability to fuel gas and oxidizing gas and electric conductivity and are mounted so as to be electrically connected respectively to the surface of the catalytic reaction layer 2a and to the surface of the catalytic reaction layer 2c.

And in the fuel cell 101, the catalytic reaction layer 2a and the gas diffusion layer 3a together form an anode 4a. In addition, in the fuel cell 101, the catalytic reaction layer 2c and the gas diffusion layer 3c together form a cathode 4c. Additionally, in the fuel cell 101, the polymer electrolyte membrane 1, the anode 4a, and the cathode 4c together form the MEA 5.

On the other hand, as shown in FIG. 1, the polymer electrolyte membrane 1 of the MEA 5 is sandwichedly held between the gaskets 9a and 9c of electrical insulation. Further, the gaskets 9a and 9c and the gas diffusion layers 3a and 3c are sandwichedly held between separators 7a and 7c of electrical conductivity. Hereby, the cell 102 is formed in the fuel cell 101. Here, there is provided in in the cell 102 a fuel gas passage 6a which is cancavely formed in a surface of the separator 7a that is in abutment with the gas diffusion layer 3a. Through the fuel gas passage 6a, fuel gas supplied from the fuel gas supplier is fed to the gas diffusion layer 3a of the MEA 5 and, in addition, gas generated by a catalytic reaction and excess fuel gas are discharged to outside the cell 102. In addition, there is provided in in the cell 102 an oxidizing gas passage 6c which is cancavely formed in a surface of the separator 7c that is in abutment with the gas diffusion layer 3c. Through the oxidizing gas passage 6c, oxidizing gas supplied from the oxidizing gas supplier is fed to the gas diffusion layer 3c of the MEA 5 and, in addition, gas generated by a catalytic reaction and excess oxidizing gas are discharged to outside the cell 102. In addition, the separator 7a and the gas diffusion layer 3a are electrically connected together and, likewise, the separator 7c and the gas diffusion layer 3c are also electrically connected together.

And, as shown in FIG. 1, a plurality of cells 102 are stacked in electrical series on upon the other to thereby form the fuel cell 101. Here, in the fuel cell 101, in order to obtain a desired output voltage, a plurality of cells 102 are connected together in electrical series so that the separator 7a of one cell 102 is electrically connected to the separator 7c of the other cell 102. In addition, in the fuel cell 101, mutually opposing concave portions are formed in a surface of the separator 7a in abutment with its adjacent separator 7c and in a surface of the separator 7c in abutment with its adjacent separator 7a. Hereby, a cooling water passage 8a and a cooling water passage 8c are formed. In addition, in order to prevent the leakage of cooling water flowing and passing through the cooling water passages 8a and 8c, a gasket 10 is arranged between the separator 7a and the adjacent separator 7c. The cooling water passages 8a and 8c are supplied with cooling water from a cooling water supplier (not shown in FIG. 1) and the cooling water thus supplied is used to cool the fuel cell 101 which generates heat during the electric power generating operation. And, heat energy recovered from the fuel cell 101 by cooling water is used, for example, for the supply of hot water.

Figure 2:
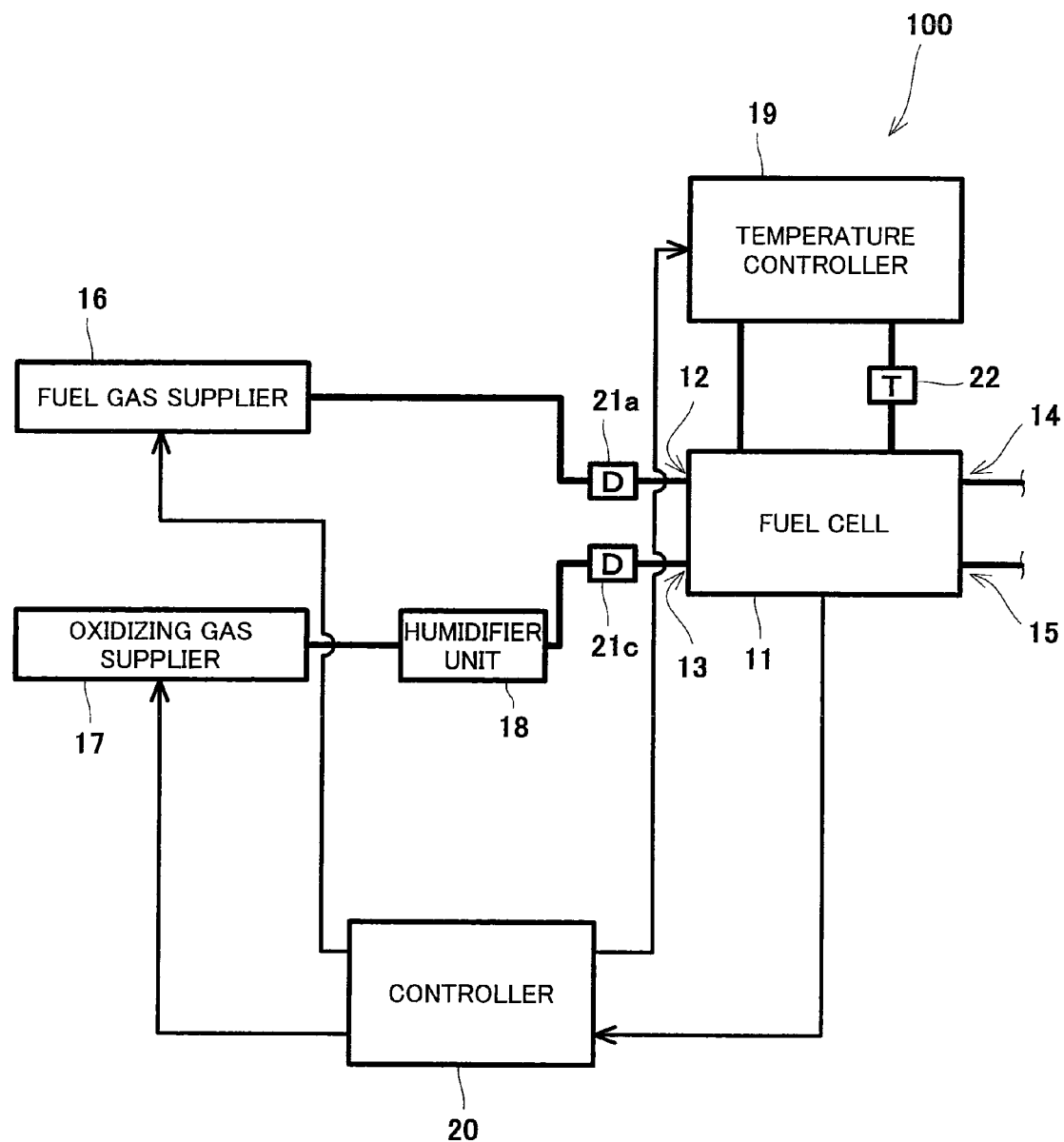
FIG. 2 is a block diagram schematically illustrating a configuration of the fuel cell system according to the first embodiment of the present invention.

FIG. 2 is a block diagram schematically illustrating a configuration of the fuel cell system according to the first embodiment of the present invention. Note that, in FIG. 2, only constituent components necessary for providing a description of the present invention are selected for diagrammatic representation, and a diagrammatic representation of the other constituent components is omitted.

As shown in FIG. 2, the fuel cell system 100 according to the first embodiment of the present invention is provided, as a main body of its power generation section, with a fuel cell 11 (which corresponds to the fuel cell 101 shown in FIG. 1) which is supplied with fuel gas and oxidizing gas and generates electric power. In addition, the fuel cell system 100 includes a fuel gas supplier 16 which produces fuel gas and supplies it to the fuel cell 11, an oxidizing gas supplier 17 which produces oxidizing gas and supplies it to the fuel cell 11, a humidifier unit 18 which humidifies oxidizing gas supplied from the oxidizing gas supplier 17 to the fuel cell 11 along the way therebetween, a dew point sensor 21a which detects the dew point temperature (hereinafter referred to simply as the "dew point") of oxidizing gas from the humidifier unit 18, and a dew point sensor 21c which detects the dew point of fuel gas supplied from the fuel gas supplier 16.

In addition, the fuel cell system 100 further includes a temperature controller 19 which controls, by means of cooling medium (for example, cooling water), the temperature of the fuel cell 11 which is supplied with fuel gas and oxidizing gas and generates electric power, and a temperature sensor 22 which detects the temperature of cooling medium which is circulated between the temperature controller 19 and the fuel cell 11. Further, the fuel cell system 100 includes a controller 20 which properly controls the operations of the fuel cell 11, the fuel gas supplier 16, the oxidizing gas supplier 17, and the temperature controller 19.

Going into details, as shown in FIG. 2, the fuel cell 11 includes a fuel gas supply unit 12 and an oxidizing gas supply unit 13, and a fuel gas discharge unit 14 and an oxidizing gas discharge unit 15. During the electric power generating operation of the fuel cell system 100, fuel gas generated by the fuel gas supplier 16 is fed, after its dew point is detected by the dew point sensor 21a, to the fuel gas supply unit 12 of the fuel cell 11. And, excess fuel gas (exhaust fuel gas) in the fuel cell 11 is discharged from the fuel gas discharge unit 14 of the fuel cell 11. Meanwhile, oxidizing gas supplied from the oxidizing gas supplier 17 is fed, after it is humidified by the humidifier unit 18 and its dew point is detected by the dew point sensor 21c, to the oxidizing gas supply unit 13 of the fuel cell 11. And, excess oxidizing gas (exhaust oxidizing gas) in the fuel cell 11 is discharged from the oxidizing gas discharge unit 15 of the fuel cell 11.

The fuel gas supplier 16 is formed, for example, by a reformer, and uses a source material, such as town gas, propane gas, or other like gas, to generate a hydrogen-rich fuel gas by a steam reforming reaction. The fuel gas is humidified during the steam reforming reaction. And the steam-containing fuel gas is supplied to the fuel cell 11. Because of this supply of steam-containing fuel gas to the fuel cell 11 from the fuel gas supplier 16, the polymer electrolyte membrane (not shown in FIG. 2) of the fuel cell 11 is maintained in the wet state. Although not shown by way of example in the present embodiment, in the case where pure hydrogen filled in a hydrogen cylinder is used as a fuel gas there is arranged between the fuel gas supplier 16 and the dew point sensor 21a a humidifier for humidifying the pure hydrogen.

The oxidizing gas supplier 17 is formed, for example, by a "sirocco" fan and takes in air as an oxidizing gas from the atmosphere. And, the air thus taken in is supplied to the fuel cell 11. Here, generally the amount of steam contained in the air taken in from the atmosphere is not enough to place the polymer electrolyte membrane of the fuel cell 11 in the wet state. To cope with this, as shown in FIG. 2, the humidifier unit 18 is disposed between the oxidizing gas supplier 17 and the dew point sensor 21c in the fuel cell system 100. The humidifier unit 18 humidifies air delivered from the oxidizing gas supplier 17 and then supplies the humidified air to the fuel cell 11. Also because of this supply of air humidified by the humidifier unit 18 to the fuel cell 11 from the oxidizing gas supplier 17, the polymer electrolyte membrane of the fuel cell 11 is maintained in the wet state.

The dew point sensor 21a detects the dew point of fuel gas supplied to the fuel cell 11 from the fuel gas supplier 16. In addition, the dew point sensor 21c detects the dew point of oxidizing gas supplied to the fuel cell 11 from the oxidizing gas supplier 17. In the present embodiment, the dew point of fuel gas detected by the dew point sensor 21a and the dew point of oxidizing gas detected by the dew point sensor 21c are regarded as the fuel gas dew point Tda and as the oxidizing gas dew point Tdc, respectively, in the inside of the fuel cell 11. Furthermore, as these dew point sensors 21a and 21c, any type of dew point sensor may be employed as long as it has durability against gases such as fuel gas and oxidizing gas and temperature durability. In addition, the fuel gas dew point Tda depends upon the performance of the fuel gas supplier 16 (to be correct, the reformer that forms the fuel gas supplier 16) while the oxidizing gas dew point Tdc depends upon the performance of the humidifier unit 18. Therefore, it may be arranged such that the dew point calculated based on the operation condition of the reformer is used as the fuel gas dew point Tda while the dew point calculated based on the operation condition of the humidifier unit 18 or the temperature of the humidifier unit 18 (actual measurement value) is used as the oxidizing gas dew point Tdc.

The temperature controller 19 is formed, for example, by a circulation pump configured to circulate cooling medium, and a heat radiator (such as a cooling fin, a heat exchanger, et cetera). The temperature controller 19 provides a supply of cooling medium of, for example, water to the fuel cell 11 and recovers cooling medium, the temperature of which is increased by heating by heat generated associated with the generation of electric power, from the fuel cell 11. And, the temperature controller 19 cools the heated cooling medium and again supplies it to the fuel cell 11. Alternatively, the temperature controller 19 decreases, by making a change in at least either one of the conditions, i.e., the flow rate of and the temperature of cooling medium, the temperature of the fuel cell 11. For example, it becomes possible to decrease the temperature of the fuel cell 11 by increasing the flow rate of cooling medium within the temperature controller 19. In addition, it becomes possible to decrease the temperature of the fuel cell 11 by decreasing the temperature of cooling medium. Hereby, the temperature controller 19 maintains the temperature of the fuel cell 11 at a constant level of temperature. And, heat energy recovered from the fuel cell 11 by the cooling medium is used, for example, for the supply of hot water.

The temperature sensor 22 detects the temperature of cooling medium discharged to the temperature controller 19 from the fuel cell 11. In the present embodiment, the temperature of cooling medium detected by the temperature sensor 22 is regarded as the temperature Tcell of the fuel cell 11. In addition, in the present invention, the substantially highest of the temperatures of the fuel cells 11 is defined as the temperature Tcell of the fuel cell 11. As a method for detecting the temperature Tcell, it is conceivable to use a method which measures the temperature of cooling medium supplied to the fuel cell 11, a method which directly measures, by means of a thermocouple, the temperature of a separator (not shown in FIG. 2) which constitutes the fuel cell 11, a method which measures the temperature of cooling medium discharged from the fuel cell 11, or other like method. Meanwhile, since the cooling medium supplied from the inlet is discharged from the exit after the exchange of heat with the fuel cell 11, the area or highest temperature in the fuel cell 11 is assumed as a portion of the fuel cell 11 at which the cooling medium is exited. In view of this, in the present embodiment, it is arranged such that the temperature of cooling medium discharged to the temperature controller 19 from the fuel cell 11 is detected using the temperature sensor 22.

In addition, the controller 20 properly controls at least the operations of the fuel cell 11, the fuel gas supplier 16, the oxidizing gas supplier 17, and the temperature controller 19. The controller 20 is provided with, for example, an MPU and a memory. Based on the data prestored in the memory, the controller 20 properly controls at least each of the operations of the fuel cell 11, the fuel gas supplier 16, the oxidizing gas supplier 17, and the temperature controller 19.

Next, referring to FIGS. 2 through 4, a description will be made of the operation of the fuel cell system according to the first embodiment of the present invention.

In the embodiment of the present invention, during the electric power generating operation of the fuel cell system, the following interrelation: $Tcell=Tda$ is satisfied where Tcell is the fuel cell temperature and Tda is the fuel gas dew point. In addition, in the embodiment of the present invention, during the electric power generating operation of the fuel cell system, the following interrelation: $Tcell>Tdc$ is satisfied where Tcell is the fuel cell temperature and Tdc is the oxidizing gas dew point. The operating condition that meets the interrelations: $Tcell=Tda$ and $Tcell>Tdc$ will be referred to as a "proper low-humidification operating condition" in the present specification.

Furthermore, in the embodiment of the present invention, it may be possible to employ, for example, an operating condition that meets the following interrelations: cooling medium temperature at the fuel cell's inlet=$Tda<Tcell$, and cooling medium temperature at the fuel cell's inlet=$Tdc<Tcell$ during the electric power generating operation of the fuel cell system Even in such an operating condition that does not satisfy the interrelation between the fuel cell temperature Tcell and the fuel gas dew point Tda, i.e., $Tcell=Tda$, the advantageous effects of the present invention can be accomplished if the oxidizing gas dew point Tdc is a dew point that falls within a predetermined range relatively approximate to the fuel cell temperature Tcell.

The operation of the fuel cell system according to the present embodiment is the same as the operation of the conventional fuel cell system, with the exception that the fuel cell is operated in a proper low-humidification operating condition and the polymer electrolyte membrane is sufficiently and definitely humidified before the electric connection between the fuel cell and the external load is interrupted (that is, before the fuel cell enters the open circuit state). Therefore, in the following, only characteristic operations of the fuel cell system according to the present embodiment will be described in detail.

Figure 3:
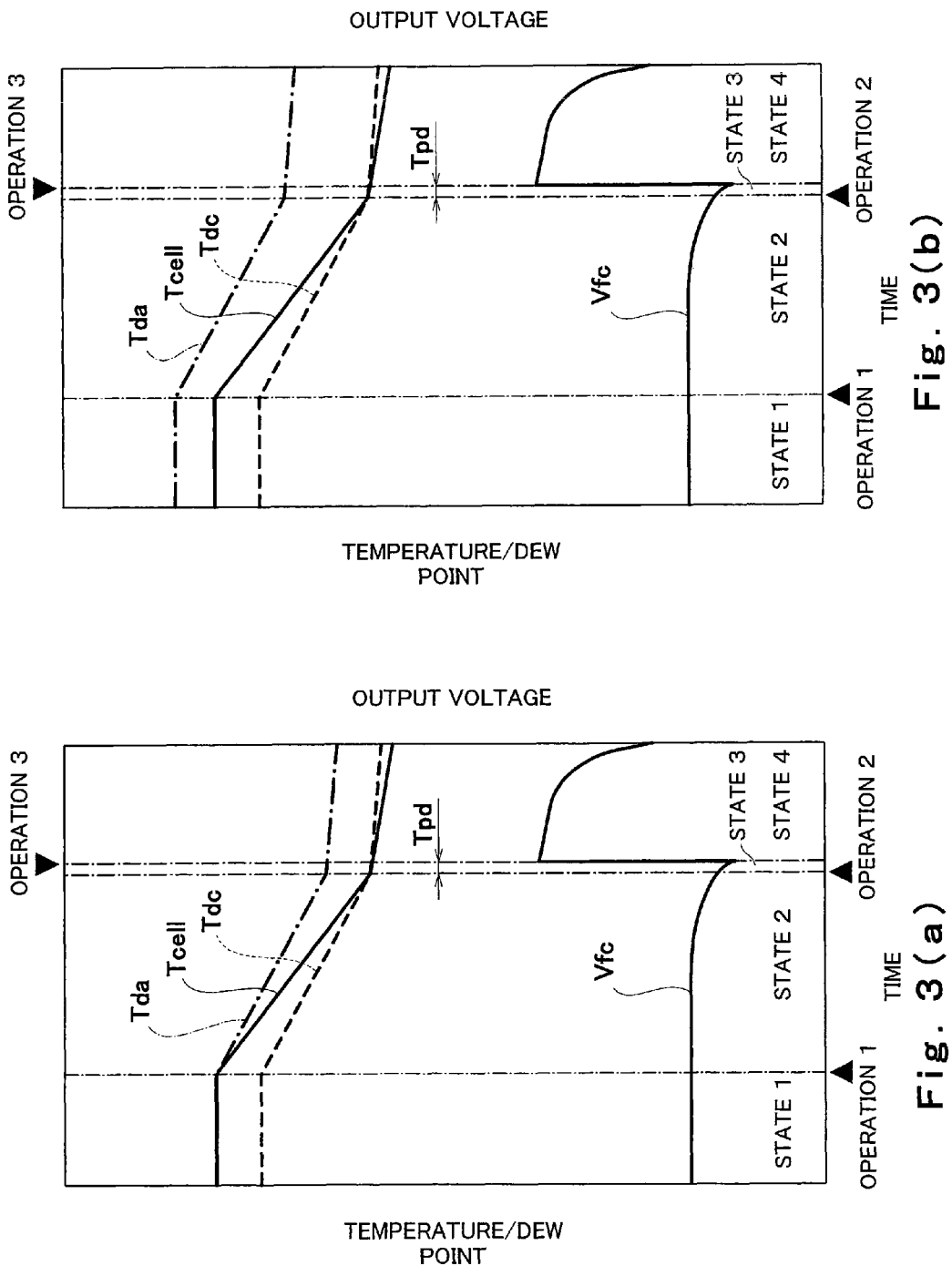
FIG. 3 is a time chart schematically representing temporal variations of the fuel cell temperature Tcell, the fuel gas dew point Tda, the oxidizing gas dew point Tdc, and the fuel cell output voltage Vfc in a characteristic operation of the fuel cell system according to the first embodiment of the present invention.

FIG. 3 is a time chart schematically representing temporal variations in the fuel cell temperature Tcell, the fuel gas dew point Tda, the oxidizing gas dew point Tdc, and the fuel cell output voltage Vfc in a characteristic operation of the fuel cell system according to the first embodiment of the present invention. Note that, in FIG. 3, only operations necessary for providing a description of the present invention are selected for diagrammatic representation, and a diagrammatic representation of the other operations is omitted.

Figure 4:
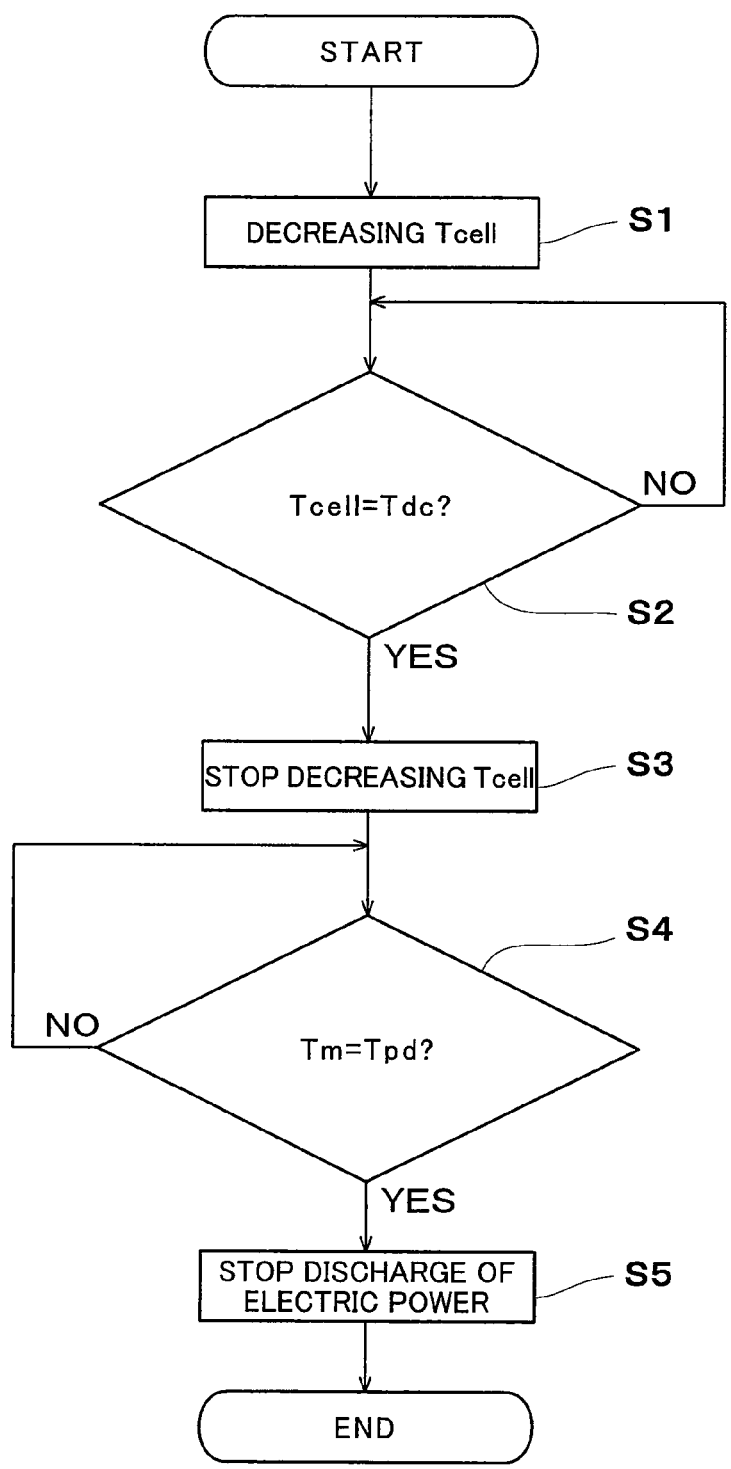
FIG. 4 is a flow chart schematically representing a characteristic operation of the fuel cell system according to the first embodiment of the present invention.

In addition, FIG. 4 is a flow chart schematically representing a characteristic operation of the fuel cell system according to the first embodiment of the present invention. Note that, in FIG. 4, only steps necessary for providing a description of the present invention are selected for diagrammatic representation, and a diagrammatic representation of the other steps is omitted.

As shown in STATE 1~OPERATION 1~STATE 2 of FIG. 3a, when bringing the electric power generating operation of the fuel cell system 100 to a stop, the controller 20 first controls the operation of the temperature controller 19 so that the temperature Tcell of the fuel cell 11 (which is being in operation in a proper low-humidification operating condition that meets the following interrelations: Tcell=Tda and Tcell>Tdc) is decreased until the temperature Tcell of the fuel cell 11 conforms to the oxidizing gas dew point Tdc (Step S1). Here, in STATE 2 shown in FIG. 3(*a*), the controller 20 controls the fuel cell 11 to continue to discharge electric power, without interrupting the electric connection between the fuel cell 11 and the external load.

Subsequently, based on output signals from the dew point sensor 21*c* and the temperature sensor 22, the controller 20 makes a decision of whether or not the temperature Tcell of the fuel cell 11 conforms to the oxidizing gas dew point Tdc, while causing the fuel cell 11 to continue to discharge electric power (Step S2).

If, the decision made in Step S2 is that the temperature Tcell of the fuel cell 11 does not yet conform to the oxidizing gas dew point Tdc ("NO" in Step S2), the controller 20 maintains control represented in Step S1 until the time that the temperature Tcell of the fuel cell 11 conforms to the oxidizing gas dew point Tdc, while the fuel cell 11 is left to continue to discharge electric power.

On the other hand, if the decision made in Step S2 that the temperature Tcell of the fuel cell 11 conforms to the oxidizing gas dew point Tdc ("YES" in Step S2), the controller 20 brings the cooling operation of the temperature controller 19 to a stop, while causing the fuel cell 11 to continue to discharge electric power (OPERATION 2 and Step S3), and maintains the operating state of the fuel cell system 100 until the time that the measurement time Tm reaches a preset predetermined time Tpd (STATE 3). In STATE 3 shown in FIG. 3(*a*), with the aid of water contained in the fuel gas and the oxidizing gas, the polymer electrolyte membrane of the fuel cell 11 is sufficiently humidified to such a level that the deterioration of the polymer electrolyte membrane becomes preventable.

Next, the controller 20 makes a decision of whether or not the measurement time Tm reaches the preset predetermined time Tpd (Step S4).

If the decision made in Step S4 is that the measurement time Tm does not yet reach the preset predetermined time Tpd ("NO" in Step S4), the controller 20 further maintains the operating state of the fuel cell system 100 until the time that the measurement time Tm reaches the preset predetermined time Tpd, while causing the fuel cell 11 to continue to discharge electric power.

On the other hand, if the decision made in Step S4 is that the measurement time Tm reaches the preset predetermined time Tpd ("YES" in Step S4), the controller 20 interrupts the electric connection between the fuel cell 11 and the external load (OPERATION 3) to cause the fuel cell 11 to stop discharging electric power (Step S5). Hereby, the controller 20 places the fuel cell 11 in the open circuit state (STATE 4). In STATE 4 shown in FIG. 3(*a*), by the fuel cell 11 being placed in the open circuit state, the output voltage Vfc of the fuel cell 11 increases, but the wet state of the polymer electrolyte membrane of the fuel cell 11 is higher than that of the polymer electrolyte membrane during the electric power generating operation. In addition, the electric connection between the fuel cell 11 and the external load is interrupted by an output controller, such as an inverter or such like, of the fuel cell system 100.

Thereafter, the controller 20 causes the fuel gas supplier 16 and the oxidizing gas supplier 17 to stop their operation. In addition, the controller 20 provides control that causes prehumidified inactive gas to be sealed in the fuel cell 11 as required, in order to further ensure that the polymer electrolyte membrane is prevented from drying over long periods. And, the controller 20 brings all the operations relating to the electric power generating operation of the fuel cell system 100 to a stop.

In this way, in the present embodiment, since the proper low-humidification operation that meets the following interrelations: Tcell=Tda and Tcell>Tdc and the sealing-in of humidified inactive gas are repeated, thereby lessening the swelling and contraction of the polymer electrolyte membrane. This makes it possible to lessen the concentration of stress in the polymer electrolyte membrane, whereby it becomes possible to prevent the polymer electrolyte membrane from damage such as breakage associated with the increase in the number of times the polymer electrolyte fuel cell is started up/shut down.

In addition, in the present embodiment, when bringing the electric power generating operation of the fuel cell 11 to a stop from the state in which the fuel cell 11 is being operated in a proper low-humidification operating condition that meets the following interrelations: Tcell=Tda and Tcell>Tdc, the controller 20 provides control so that: the temperature Tcell of the fuel cell 11 decreases; the fuel cell 11 continues to discharge electric power until the time that the temperature Tcell of the fuel cell 11 and the oxidizing gas dew point Tdc conform to each other; and after the temperature Tcell of the fuel cell 11 and the oxidizing gas dew point Tdc conform to each other, the fuel cell 11 stops discharging electric power to the external load. This realizes the interrelations: Tcell=Tdc and Tcell<Tda, whereby the polymer electrolyte membrane is sufficiently humidified. Therefore, it becomes possible to prevent the polymer electrolyte membrane from deterioration, and the durability of the fuel cell 11 is sufficiently ensured.

Next, a description will be made of a modification of the operation of the fuel cell system according to the present embodiment.

In the modification of the operation of the fuel cell system according to the present invention, the fuel cell 11 is operated not in the foregoing proper low-humidification operating condition that meets the following interrelations: Tcell=Tda and Tcell>Tdc, but in a second proper low-humidification operating condition (which will be hereinafter referred to also as a "proper low-humidification operating condition" for the sake of convenience) that meets the following interrelations: Tcell<Tda and Tcell>Tdc. This point is only the difference from the operation of the foregoing fuel cell system 100. Accordingly, the flow chart of the present modification is the same as the flow chart shown in FIG. 4.

As shown in STATE 1~OPERATION 1~STATE 2 of FIG. 3(*b*), when bringing the electric power generating operation of the fuel cell system 100 to a stop, the controller 90 first controls the operation of the temperature controller 19 so that the temperature Tcell of the fuel cell 11 (which is in operation in a proper low-humidification operating condition that meets the following interrelations: Tcell<Tda and Tcell>Tdc) is decreased until the temperature Tcell of the fuel cell 11 conforms to the oxidizing gas dew point Tdc (Step S1). Also in STATE 2 shown in FIG. 3(*b*), the controller 20 provides control so that the electrical connection between the fuel cell 11 and the external load is maintained.

Subsequently, based on output signals of the dew point sensor 21*c* and the temperature sensor 22, the controller 20 makes a decision of whether or not the temperature Tcell of the fuel cell 11 conforms to the oxidizing gas dew point Tdc, while causing the fuel cell 11 to continue to discharge electric power (Step S2). And if the decision is that the temperature Tcell of the fuel cell 11 conforms to the oxidizing gas dew point Tdc ("YES" in Step S2), the controller 20 stops the cooling operation of the temperature controller 19 while the fuel cell 11 is left to continue to discharge electric power (OPERATION 2 and Step S3), and maintains the operation state of the fuel cell system 100 until the time that the measurement time Tm reaches the preset predetermined time Tpd (STATE 3).

And if the decision is that the measurement time Tm reaches the preset predetermined time Tpd ("YES" in Step S4), the controller 20 interrupts the electric connection between the fuel cell 11 and the external load (OPERATION 3), and the fuel cell 11 is made to stop discharging electric power (Step S5), and the fuel cell 11 is placed in the open circuit state (STATE 4).

In this way, in the present modification, when bringing the electric power generating operation of the fuel cell 11 to a stop from the state in which the fuel cell 11 is being operated in the proper low-humidification operating condition, the controller 20 provides control so that the temperature Tcell of the fuel cell 11 decreases; the fuel cell 11 continues to discharge electric power until the time that the temperature Tcell of the fuel cell 11 conforms to the oxidizing gas dew point Tdc; and after the temperature Tcell of the fuel cell 11 conforms to the oxidizing gas dew point Tdc, the fuel cell 11 stops discharging electric power to the external load. Hereby, the further much proper low-humidification operation and the sealing-in of humidified inactive gas are repeated, thereby further lessening the swelling and contraction of the polymer electrolyte membrane. Therefore, it becomes possible to further lessen the concentration of stress in the polymer electrolyte membrane, thereby making it possible to further ensure that damage, such as breakage, to the polymer electrolyte membrane associated with the increase in the number of times the polymer electrolyte fuel cell is stared up/shut down, is prevented.

In addition, in accordance with the present modification, the interrelation Tcell=Tcd and the interrelation Tcell<<Tda are realized in the open circuit state in which the fuel cell 11 stops discharging electric power to the external load, whereby the polymer electrolyte membrane is much sufficiently humidified. Therefore, it becomes possible to further suppress the deterioration of the polymer electrolyte membrane, thereby making it possible to definitely ensure the durability of the fuel cell 11.

As described above, in the present embodiment, either the operating condition that meets the following interrelations: Tcell=Tda and Tcell>Tdc or the operating condition that meets the following interrelations: Tcell<Tda and Tcell>Tdc is employed as a proper low-humidification operating condition. By virtue of such a proper low-humidification operating condition, it becomes possible to prevent the polymer electrolyte membrane from excessive humidification, while the proton conductivity from the anode side to the cathode side in the polymer electrolyte fuel cell and the conversion efficiency of energy at the time when acquiring electric energy are sufficiently ensured.

In addition, in the present embodiment, the description has been made of an embodiment in which, by means of the dew point sensor 21c and the temperature sensor 22, the oxidizing gas dew point Tdc and the temperature Tcell of the fuel cell 11 are actually measured and, according to such measurement, the electric power generating operation of the fuel cell 11 is brought to a stop. Such an embodiment should not, however, be considered limitative. For example, it may be possible to employ an embodiment in which the electric power generating operation of the fuel cell 11 is shut down based on a time chart representative of a relation between the pre-measured Tcell and Tdc. Even in such an embodiment, the same advantageous effects as accomplished by the present embodiment can be provided.

In addition, in the present embodiment, the description has been made of an embodiment in which, the electric connection between the fuel cell 11 and the external load is interrupted after the measurement time Tm reaches the preset predetermined time Tpd. Such an embodiment should not, however, be considered limitative. For example, it may be possible to employ an embodiment in which the electric connection between the fuel cell 11 and the external load is interrupted immediately after the temperature Tcell of the fuel cell 11 conforms to the oxidizing gas dew point Tdc. Even in such an embodiment, the same advantageous effects as accomplished by the present embodiment can be provided.

In addition, either when the interrelation Tcell<Tda is realized or when the interrelation Tcell<<Tda is realized in the present embodiment, "Tda" is the temperature that is obtained by conversion of the total amount of water content contained in the fuel gas into the temperature of dew point. Here, what is meant by "the total amount of water content contained in the fuel gas" is the total amount of water content that is the sum of the amount of steam and the amount of water contained in the fuel gas. For example, even if a part of the amount of water content contained in the fuel gas becomes dew to cause the fuel gas to contain steam and water, the temperature, obtained by conversion of the total amount of water content which is the sum of the amount of steam and the amount of water contained in the fuel gas into the temperature of dew point, serves as Tda on the basis of the said definition.

Likewise, either when the interrelation Tcell=Tdc is realized or when the interrelation Tcell<Tdc is realized, "Tdc" is the temperature that is obtained by conversion of the total amount of water content contained in the oxidizing gas into the temperature of dew point. Here, what is meant by "the total amount water content contained in the oxidizing gas" is the total amount of water content that is the sum of the amount of steam and the amount of water contained in the oxidizing gas. For example, even if a part of the amount of water content contained in the oxidizing gas becomes dew to cause the oxidizing gas to contain steam and water, the temperature, obtained by conversion of the total amount of water content which is the sum of the amount of steam and the amount of water contained in the oxidizing gas into the temperature of dew point, serves as Tdc on the basis of the said definition.

In addition, as described above, in the present embodiment, the controller 20 causes either the fuel gas dew point or the oxidizing gas (Tda in the present embodiment) to become higher than or equal to the temperature of the fuel cell 11 while causing the other dew point (Tdc in the present embodiment) to be less than the temperature of the fuel cell 11 during the electric power generation of the fuel cell 11 and, thereafter, makes the temperature Tcell of the fuel cell 11 and the other dew point conform to each other before interrupting the electric connection between the fuel cell 11 and the load, and then interrupts the electric connection between the fuel cell 11 and the load. Here, what is meant by the phrase "making the temperature Tcell of the fuel cell 11 and the other dew point conform to each other" is that there is made a shift, for example, from a first condition to a second condition in the fuel cell system 100 where the first condition is: Tcell (the fuel cell's 11 temperature)>the other dew point and the second condition is: Tcell (the fuel cell's 11 temperature)=the other dew point. In addition, here, what is meant by the phrase "making the temperature Tcell of the fuel cell 11 and the other dew point conform to each other before interrupting the electric connection between the fuel cell 11 and the load" is, for example, either the case where the condition (i.e., the first condition) is satisfied during the electric power generation of the fuel cell 11 or the case where the condition (i.e., the second condition) is satisfied when the electric connection between the fuel cell 11 and the load is interrupted.

Next, a mechanism of how the problems associated with the prior art are solved by the present invention will be conceptually described with reference to FIG. 12.

Figure 12A:
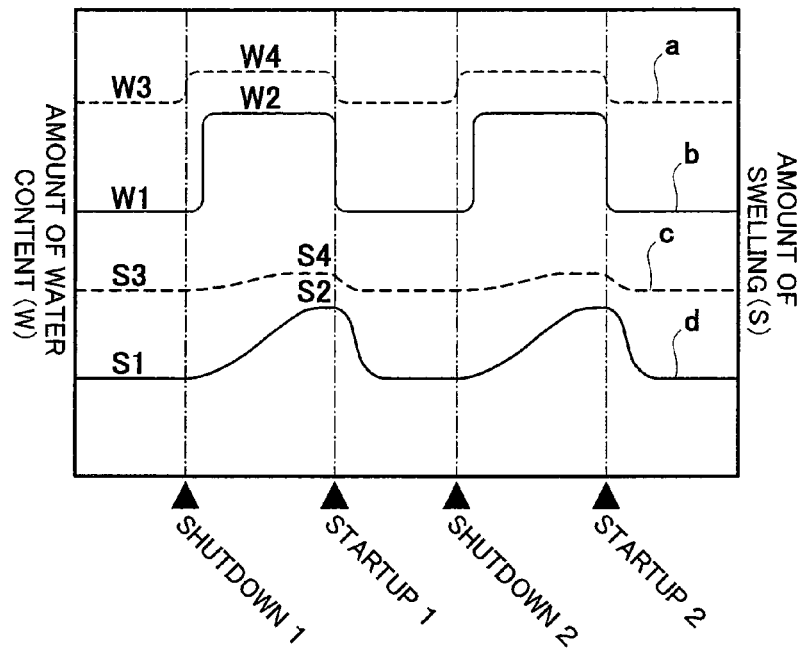
FIG. 12 is a descriptive diagram conceptually showing a mechanism of how the problems associated with the conventional techniques are solved by the present invention.
Figure 12B:
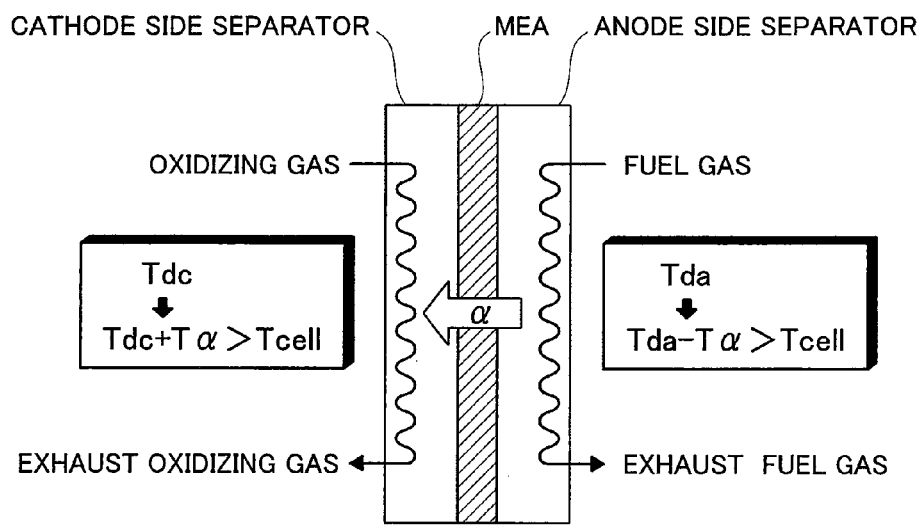

FIG. 12 is a descriptive diagram conceptually showing a mechanism of how the problems associated with the conventional techniques are solved by the present invention. In FIG. 12, FIG. 12(a) is a descriptive diagram illustrating a mechanism of how the deterioration of the polymer electrolyte membrane due to damage, such as breakage, is overcome while FIG. 12(b) is a descriptive diagram illustrating a mechanism of how the deterioration of the polymer electrolyte membrane due to drying, is overcome. Further, in FIG. 12(a), the curve line "a" represents the variation in the amount of water content of the polymer electrolyte membrane in the startup/shut-down operation of the fuel cell system when the present invention is applied while on the other hand the curve line "c" represents the variation in the amount of expansion of the polymer electrolyte membrane in the startup/shut-down operation of the fuel cell system when the present invention is applied. In addition, in FIG. 12(a), the curve line "b" represents the variation in the amount of water content in the polymer electrolyte membrane in the startup/shut-down operation of a conventional fuel cell system while on the other hand the curve line "d" represents the variation in the amount of expansion of the polymer electrolyte membrane in the startup/shut-down operation of the conventional fuel cell system.

As shown by the curve line "b" of FIG. 12(a), in the conventional fuel cell system, the low-humidification operation and the sealing-in of inactive gas are repeated when, in the startup/shutdown operation, the startup/shutdown proceeds in the order of SHUTDOWN 1~STARTUP 1~SHUTDOWN 2~STARTUP 2. Therefore, the amount of water content of the polymer electrolyte membrane of the fuel cell varies considerably between W1 and W2. Accordingly, as represented by the curve line "d" of FIG. 12(a), in the conventional fuel cell system, the amount of swelling of the polymer electrolyte membrane of the fuel cell considerably varies between S1 and S2. Therefore, in the conventional fuel cell system, with the increase in the number of times it is started up/shut down, stress concentrates on a part of the polymer electrolyte membrane of the fuel cell and damage, such as breakage, increases at the part of the polymer electrolyte membrane. This causes the problem that the electric power generating performance of the fuel cell system drops with time.

Therefore, in the present invention, the variation in the amount of water content of the polymer electrolyte membrane of the fuel cell is suppressed by employing a proper low-humidification operating condition as an operating condition of the fuel cell system during the electric power generating operation. And by the suppression of the variation in the amount of swelling of the polymer electrolyte membrane, the concentration of stress in the polymer electrolyte membrane is avoided. Hereby, damage, such as breakage, is prevented from increasing at a certain part of the polymer electrolyte membrane, thereby overcoming the problem that the electric power generating performance of the fuel cell system drops with time.

A description will be made with reference to the curve line "a" of FIG. 12(a). In the fuel cell system according to the present invention, the proper low-humidification operation and the sealing-in of inactive gas are repeated when, in the startup/shutdown operation, the startup/shutdown proceeds in the order of SHUTDOWN 1~STARTUP 1~SHUTDOWN 2~STARTUP 2 and, therefore, the amount of water content of the polymer electrolyte membrane of the fuel cell varies between W3 and W4. Here, the variation in the amount of water content of the polymer electrolyte membrane between W3 and W4 is smaller than the variation in the amount of water content of the polymer electrolyte membrane between W1 and W2 (represented by the curve line "b") because of employing a proper low-humidification operating condition as the operating condition of the fuel cell system during the electric power generating operation. Therefore, as shown in the curve line "c" of FIG. 12(a), in the fuel cell system according to the present invention, the amount of swelling of the polymer electrolyte membrane of the fuel cell slightly varies between S3 and S4. Here, the variation in the amount of swelling of the polymer electrolyte membrane between S3 and S4 is smaller than the variation in the amount of swelling of the polymer electrolyte membrane between S1 and S2 (represented by the curve line "d"). Hereby, it becomes possible that the concentration of stress in the polymer electrolyte membrane is avoided, whereby damage, such as breakage, is prevented from increasing at a certain part of the polymer electrolyte membrane.

Meanwhile, a mechanism of how deterioration due to the drying of the polymer electrolyte membrane is overcome will be explained as follows. That is, in the fuel cell system according to the present invention, the temperature Tcell of the fuel cell (which is in operation in a proper low-humidification operating condition that meets the following interrelations: Tcell=Tda and Tcell>Tdc) is decreased so as to conform to the oxidizing gas dew point Tdc when bringing the electric power generating operation of the fuel cell system to a stop. Then, as shown in FIG. 12(b), water present in the fuel gas flowing through the separator on the side of the anode of the fuel cell is transmitted through the MEA so that the fuel gas dew point and the oxidizing gas dew point conform to each other, and then moves into the oxidizing gas flowing through the separator on the side of the cathode of the fuel cell. At this point of time, as shown in FIG. 12(b), the fuel gas dew point transiently falls from Tda to Tda−Ta while the oxidizing gas dew point transiently rises from Tdc to Tdc+Ta, where "a" is the amount of water moving from the anode side to the cathode sided through the MEA and "Ta" is the corresponding dew point variation. Here, both the fuel gas dew point Tda−Ta and the oxidizing gas dew point Tdc+Ta are higher than the fuel cell temperature Tcell. Accordingly, the polymer electrolyte membrane of the fuel cell is provided with a supply of water from both the fuel gas and the oxidizing gas and is sufficiently and definitely humidified. And in the fuel cell system of the present invention, the electric connection between the fuel cell and the external load is interrupted, with the polymer electrolyte membrane placed in the sufficiently humidified state. Because of this, the polymer electrolyte membrane is sufficiently humidified in the open circuit state in which the fuel cell stops discharging electric power, whereby the deterioration of the polymer electrolyte membrane is suppressed, thereby making it possible that the durability of the fuel cell is sufficiently ensured.

Furthermore, in the conventional fuel cell system, when its electric power generating operation is brought to a stop, the fuel cell (which is in operation in a low-humidification operating condition that meets the following interrelations: Tcell>Tda and Tcell>Tdc) is electrically disconnected from the external load to enter the open circuit state. Therefore, the deterioration of the polymer electrolyte membrane increases.

To sum up, the durability of the fuel cell is not sufficiently ensured in the conventional fuel cell system.

In addition, as in the modification of the operation of the fuel cell system of the present embodiment which employs a proper low-humidification operating condition that meets the following interrelations: Tcell<Tda and Tcell>Tds, if, when its electric power generating operation is brought to a stop, the fuel cell temperature Tcell is made to vary so as to conform to the fuel gas dew point Tda which is the dew point on the side of higher dew point, this causes the movement of water from the fuel gas to the oxidizing gas, and the inside of the fuel cell is placed in a low-humidification state. Therefore, in such an embodiment of making the fuel cell temperature Tcell and the fuel gas dew point Tda conform to each other, it is impossible to sufficiently ensure the durability of the fuel cell, as in the case of the conventional fuel cell system.

Second Embodiment

In the first place, with reference to FIG. 5, a description will be made of the configuration of a fuel cell system according to a second embodiment of the present invention.

The configuration of the fuel cell system according to the second embodiment of the present invention is the same as the configuration of the fuel cell system according to the first embodiment as shown in FIGS. 1 and 2, with the exception that there is provided a dew point controller as a substitute for the humidifier unit 18 shown in FIG. 2. Therefore, here, a description will be made about the difference between the configuration of the fuel cell system of the present embodiment and the configuration of the fuel cell system of the first embodiment, and a description of their common parts is omitted.

Figure 5:
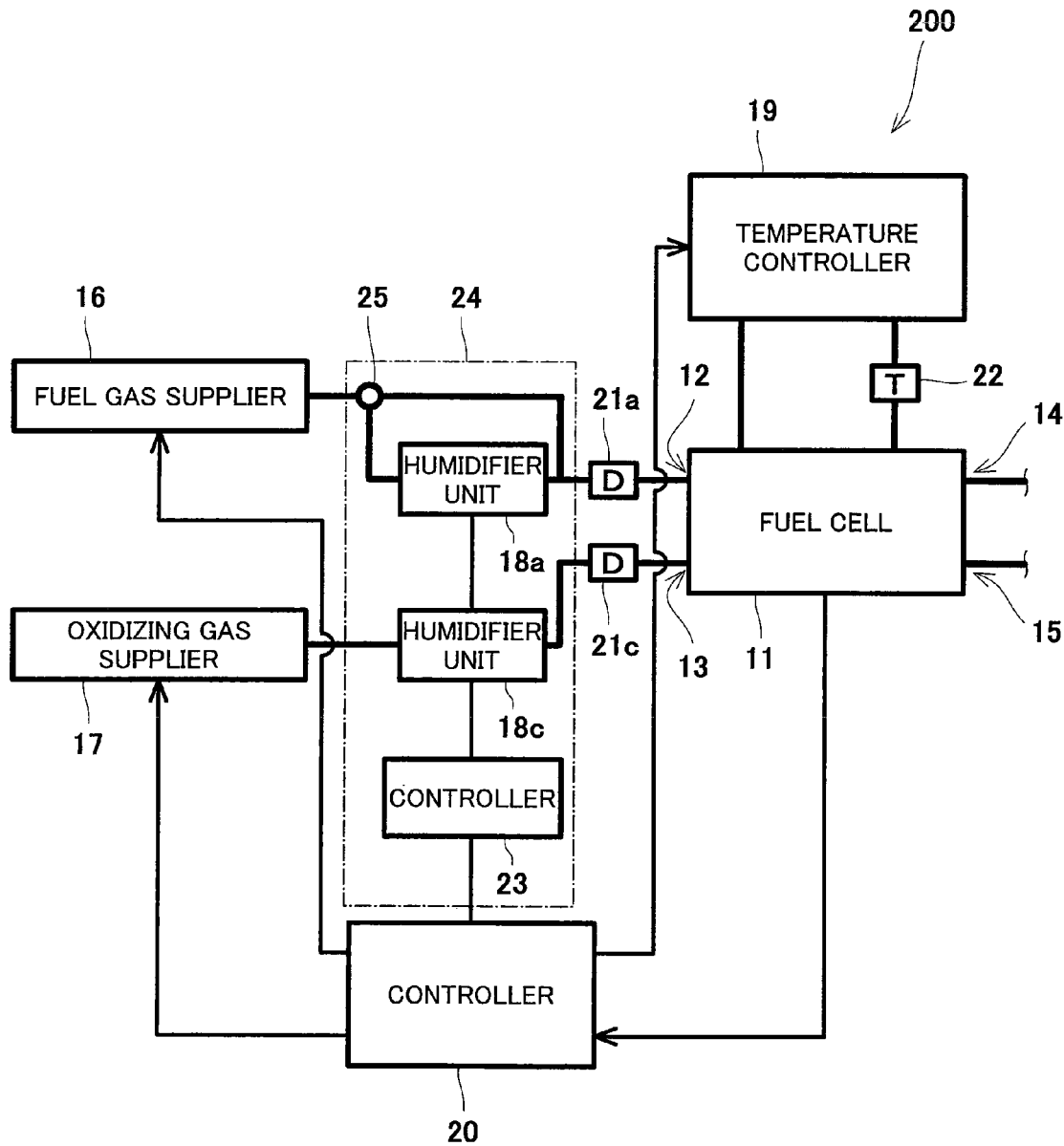
FIG. 5 is a block diagram schematically illustrating a configuration of a fuel cell system according to a second embodiment of the present invention.

FIG. 5 is a block diagram schematically illustrating a configuration of the fuel cell system of the second embodiment of the present invention. Note that, in FIG. 5, only constituent components necessary for providing a description of the present invention are selected for diagrammatic representation, and a diagrammatic representation of the other constituent components is omitted.

As illustrated in FIG. 5, a fuel cell system 200 according to the present embodiment is provided with a dew point controller 24. The dew point controller 24 controls the dew point of fuel gas supplied from the fuel gas supplier 16 and the dew point of oxidizing gas supplied from the oxidizing gas supplier 17 as required. The fuel gas dew point and the oxidizing gas dew point are practically controlled by a humidifier unit 18a and a humidifier unit 18c, respectively, of the dew point controller 24. Here, the operations of the humidifier units 18a and 18c are controlled directly by a controller 23 of the dew point controller 24. And the dew-point controlled fuel and oxidizing gases are supplied through detection points, i.e., a dew point sensor 21a and a dew point sensor 21c, to the fuel cell 11, as in the fuel cell system 100 according to the first embodiment. Furthermore, the operation of the controller 23 is controlled by a controller 20 of the fuel cell system 200.

In addition, as shown in FIG. 5, the dew point controller 24 is provided with a three-way valve 25. When there is no need to regulate the dew point of fuel gas supplied from the fuel gas supplier 16, the three-way valve 25 functions to allow fuel gas to be supplied directly to the dew point sensor 21a without directing it to the humidifier unit 18a.

Next, referring to FIGS. 5 through 7, a description will be made of the operation of the fuel cell system according to the second embodiment of the present invention.

FIG. 6 is a time chart schematically representing variations in the fuel cell temperature Tcell, the fuel gas dew point Tda, the oxidizing gas dew point Tdc, and the fuel cell output voltage Vfc in a characteristic operation of the fuel cell system according to the second embodiment of the present invention. Note that, in FIG. 6, only operations necessary for providing a description of the present invention are selected for diagrammatic representation, and a diagrammatic representation of the other operations is omitted.

Figure 7:
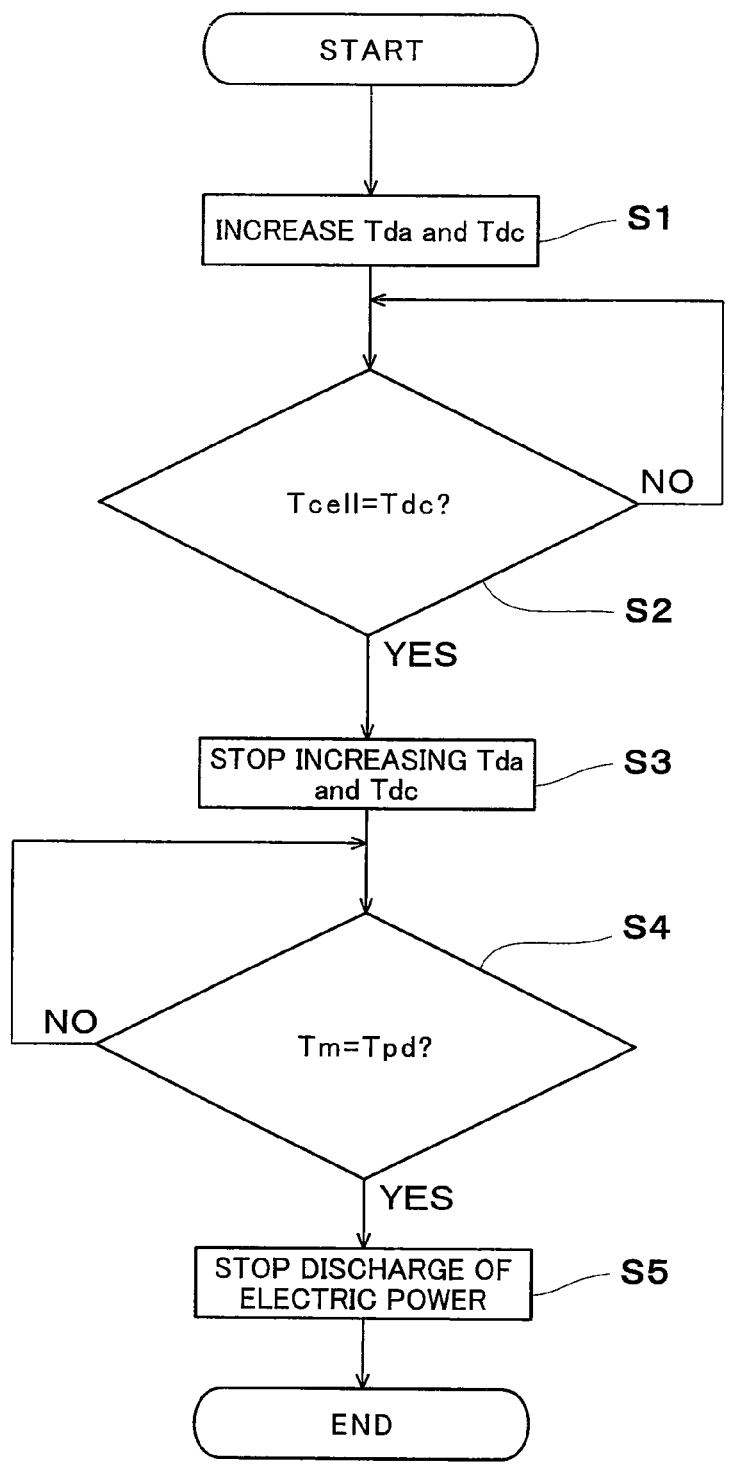
FIG. 7 is a flow chart schematically representing a characteristic operation of the fuel cell system according to the second embodiment of the present invention.

In addition, FIG. 7 is a flow chart schematically representing a characteristic operation of the fuel cell system according to the second embodiment of the present invention. Note that, in FIG. 7, only steps necessary for providing a description of the present invention are selected for diagrammatic representation, and a diagrammatic representation of the other steps is omitted.

As shown in STATE 1~OPERATION 1~STATE 2 of FIG. 6(a), when bringing the electric power generating operation of the fuel cell system 200 to a stop, in the state (STATE 1) in which the electric power generating operation of the fuel cell 11 is carried out in a proper low-humidification operating condition that meets the following interrelations: Tcell=Tda and Tcell>Tdc, the controller 20 first properly controls the operation of the dew point controller 24 (OPERATION 1), whereby the fuel gas dew point Tda and the oxidizing gas dew point Tdc are increased until the time that the oxidizing gas dew point Tdc conforms to the temperature Tcell of the fuel cell 11 (Step S1). Here, in STATE 2 shown in FIG. 6(a), the controller 20 causes the fuel cell 11 to continue to discharge electric power without interrupting the electric connection between the fuel cell 11 and the external load.

Next, while causing the fuel cell 11 to continue to discharge electric power, the controller 20 makes a decision of whether or not the oxidizing gas dew point Tdc conforms to the temperature Tcell of the fuel cell 11 on the basis of output signals from the dew point sensor 21c and the temperature sensor 22 (Step S2).

If the decision made in Step S2 is that the oxidizing gas dew point Tdc does not yet conform to the temperature Tcell of the fuel cell 11 ("NO" in Step S2), the controller 20 then continues control shown in Step S1 until the time that the oxidizing gas dew point Tdc conforms to the temperature Tcell of the fuel cell 11 while causing the fuel cell 11 to continue to discharge electric power.

On the other hand, if the decision made in Step S2 is that the oxidizing gas dew point Tdc conforms to the temperature Tcell of the fuel cell 11 ("YES" in Step S2), the controller 20 then stops the operation of the dew point controller 24 that increases the fuel gas dew point Tda and the oxidizing gas dew point Tdc (OPERATION 2 and Step S3) while causing the fuel cell 11 to continue to discharge electric power, and maintains the operating state of the fuel cell system 200 until the time that the measurement time Tm reaches the preset predetermined time Tpd (STATE 3). In STATE 3 shown in FIG. 6(a), by the use of water contained in the fuel gas and the oxidizing gas, the polymer electrolyte membrane of the fuel cell 11 is sufficiently humidified to the state that the deterioration of the polymer electrolyte membrane becomes preventable.

Next, the controller 20 makes a decision of whether or not the measurement time Tm reaches the preset predetermined time Tpd (Step S4).

If the decision made in Step S4 is that the measurement time Tm does not yet reach the preset predetermined time Tpd ("NO" in Step S4), the controller 20, while causing the fuel cell 11 to continue to discharge electric power, further maintains the operating state of the fuel cell system 200 until the time that the measurement time Tm reaches the preset predetermined time Tpd.

On the other hand, if the decision made in Step S4 is that the measurement time Tm reaches the preset predetermined time Tpd ("YES" in Step S4), the controller 20 interrupts the electric connection between the fuel cell 11 and the external load (OPERATION 3) to cause the fuel cell 11 to stop discharging electric power (Step S5). And, the controller 20 places the fuel cell 11 in the open circuit state (STATE 4).

Thereafter, the controller 20 stops the operation of the fuel gas supplier 16 and the operation of the oxidizing gas supplier 17. In addition, in order that the drying of the polymer electrolyte membrane may be prevented much more definitely over long periods, the controller 20 provides control that fills the inside of the fuel cell 11 with pre-humidified inactive gas as required, as in the case of the first embodiment. And, the controller 20 terminates all the operations relating to the electric power generating operation of the fuel cell system 200.

In this way, in the present embodiment, since the proper low-humidification operation that meets the following interrelations: Tcell=Tda and Tcell>Tdc and the sealing-in of humidified inactive gas are repeated, this lessens the swelling and contraction of the polymer electrolyte membrane, as in the case of the first embodiment. This makes it possible to lessen the concentration of stress in the polymer electrolyte membrane, whereby it becomes possible to prevent the polymer electrolyte membrane from damage, such as breakage, associated with the increase in the number of times the polymer electrolyte fuel cell is started up/shut down, as in the case of the first embodiment.

In addition, in the present invention, when bringing the electric power generating operation of the fuel cell 11 to a stop from the state in which the fuel cell is being operated in the proper low-humidification operating condition, the controller 20 causes the fuel gas dew point Tda and the oxidizing gas dew point Tdc to increase; the controller 20 controls the fuel cell 11 to continue to discharge electric power until the time that the oxidizing gas dew point Tdc conforms to the temperature Tcell of the fuel cell 11; and after the oxidizing gas dew point Tdc conforms to the temperature Tcell of the fuel cell 11, the controller 20 controls the fuel cell 11 to stop discharging electric power to the external load. This realizes the following interrelations: Tcell=Tdc and Tcell<Tda in the open circuit state in which the fuel cell 11 stops discharging electric power to the external load, whereby the polymer electrolyte membrane is sufficiently humidified, and it becomes possible to prevent the polymer electrolyte membrane from deterioration, whereby it becomes possible that the durability of the fuel cell 11 is sufficiently ensured, as in the case of the first embodiment.

Next, as with the first embodiment, a description will be made of a modification of the operation of the fuel cell system according to the present embodiment.

In the modification of the operation of the fuel cell system according to the present invention, as in the modification of the operation of the fuel cell system as shown in the first embodiment, the fuel cell 11 is operated not in a proper low-humidification operating condition that meets the following interrelations: Tcell=Tda and Tcell>Tdc, but in a different proper low-humidification operating condition that meets the interrelations: Tcell<Tda and Tcell>Tdc, which is only the difference from the operation of the foregoing fuel cell system 200. Accordingly, the flow chart of the present modification is the same as the flow chart shown in FIG. 7.

As shown in STATE 1~OPERATION 1~STATE 2 of FIG. 6(b), when bringing the electric power generating operation of the fuel cell system 200 to a stop, in the state in which the electric power generating operation of the fuel cell 11 is carried out in a proper low-humidification operating condition that meets the following interrelations: Tcell<Tda and Tcell>Tdc (STATE 1), the controller 20 first properly controls the operation of the dew point controller 24 (OPERATION 1), thereby causing the fuel gas dew point Tda and the oxidizing gas dew point Tdc to increase until the time that the oxidizing gas dew point Tdc conforms to the temperature Tcell of the fuel cell 11 (Step S1). In addition, also in STATE 2 shown in FIG. 6(b), the controller 20 provides control that maintains the electrical connection between the fuel cell 11 and the external load.

Next, while causing the fuel cell 11 to continue to discharge electric power, the controller 20 makes a decision of whether or not the oxidizing gas dew point Tdc conforms to the temperature Tcell of the fuel cell 11 on the basis of output signals from the dew point sensor 21c and the temperature sensor 22 (Step S2). And if the decision is that the oxidizing gas dew point Tdc conforms to the temperature Tcell of the fuel cell 11 ("YES" in Step S2), the controller 20 causes the dew point controller 24 to stop its control operation while causing the fuel cell 11 to continue to discharge electric power (OPERATION 2 and Step S3), and provides control that maintains the operation state of the fuel cell system 200 until the time that the measurement time Tm reaches the preset predetermined time Tpd (STATE 3).

And if it is decided that the measurement time Tm reaches the preset predetermined time Tpd ("YES" in Step S4), the controller 20 interrupts the electric connection between the fuel cell 11 and the external load (OPERATION 3) and causes the fuel cell 11 to stop discharging electric power (Step S5) to thereby place the fuel cell 11 in the open circuit state (STATE 4).

In this way, in the present modification, when bringing the electric power generating operation of the fuel cell 11 to a stop from the state in which the fuel cell 11 is being operated in a much proper low-humidification operating condition, the controller 20 causes the fuel gas dew point Tda and the oxidizing gas dew point Tdc to increase; the controller 20 controls the fuel cell 11 to continue to discharge electric power until the time that the oxidizing gas dew point Tdc conforms to the temperature Tcell of the fuel cell 11; and after the oxidizing gas dew point Tdc conforms to the temperature Tcell of the fuel cell 11, the controller 20 provides control that causes the fuel cell 11 to stop discharging electric power to the external load. Hereby, the further much proper low-humidification operation and the sealing-in of humidified inactive gas are repeated, thereby further lessening the swelling and contraction of the polymer electrolyte membrane. Therefore, the concentration of stress in the polymer electrolyte membrane is lessened to a further extent, thereby making it possible to further ensure that damage, such as breakage, to the polymer electrolyte membrane associated with the increase in the number of times the polymer electrolyte fuel cell is stared up/shut down, is prevented.

In addition, in accordance with the present modification, the interrelations: Tcell=Tdc and Tcell<<Tda are realized in the open circuit state in which the fuel cell 11 stops discharging electric power to the external load, whereby it becomes possible to further suppress the deterioration of the polymer electrolyte membrane because the polymer electrolyte membrane is much sufficiently humidified, and it becomes possible to definitely ensure the durability of the fuel cell 11.

In this way, in the present embodiment, the oxidizing gas dew point Tdc and the temperature Tcell of the fuel cell 11 are made to conform to each other by the dew point controller 24, whereby the same advantageous effects as provided in the first embodiment are accomplished.

Furthermore, in the present embodiment, the description has been made about an embodiment in which both the fuel gas dew point Tda and the oxidizing gas dew point Tdc are increased at the time when bringing the electric power generating operation of the fuel cell system 200 to a stop, but such an embodiment should not, however, be considered limitative. Alternatively, it may be possible to employ such an embodiment that only the oxidizing gas dew point Tdc is increased. For example, in the case where only the oxidizing gas dew point Tdc is increased, the controller 20 controls the three-way valve 25 so that fuel gas supplied from the fuel gas supplier 16 is fed directly to the dew point sensor 21a. Even when employing such an embodiment, the same advantageous effects as accomplished by the present embodiment are provided.

In addition, in the present embodiment, the description has been made on the assumption that the temperature of the humidifier unit of the dew point controller 24 is controlled using external electric power such as commercial electric power or the like to thereby control the fuel gas dew point Tda and the oxidizing gas dew point Tdc, which should not, however, be considered limitative. For example, it may be possible to employ such an embodiment in which the temperature of the humidifier unit of the dew point controller 24 is controlled by making changes in at least either one of the conditions, i.e., the flow rate of and the temperature of fuel gas supplied from the fuel gas supplier 16 to the fuel cell 11. Hereby, the fuel gas dew point Tda and the oxidizing gas dew point are controlled. In addition, it may be possible to employ such an embodiment in which the temperature of the humidifier unit of the dew point controller 24 is controlled by making changes in at least either one of the conditions, i.e., the flow rate of and the temperature of oxidizing gas supplied from the oxidizing gas supplier 17 to the fuel cell 11. Hereby, the fuel gas dew point Tda and the oxidizing gas dew point Tdc are controlled. Additionally, it may be possible to employ such an embodiment in which at least either one of the flow rate of and the temperature of fuel gas and at least either one of the flow rate of and the temperature of oxidizing gas are changed. Even in such an embodiment, the same advantageous effects as accomplished by the present embodiment are provided.

The rest are the same as the first embodiment.

Third Embodiment

The configuration of a fuel cell system according to a third embodiment of the present invention is identical with the configuration of the fuel cell system 200 according to the second embodiment as shown in FIG. 5. Therefore, a description regarding the configuration of the fuel cell system according to the present embodiment is omitted here.

Hereinafter, referring to FIGS. 5, 8, and 9, a description will be made of the operation of the fuel cell system according to the third embodiment of the present invention.

FIG. 8 is a time chart schematically representing variations in the fuel cell temperature Tcell, the fuel gas dew point Tda, the oxidizing gas dew point Tdc, and the fuel cell output voltage Vfc in a characteristic operation of the fuel cell system according to the third embodiment of the present invention. Furthermore, FIG. 8(a) is a time chart when the fuel cell is operated in a proper low-humidification operating condition that meets the following interrelations: Tcell=Tda and Tcell>Tdc. Furthermore, FIG. 8(b) is a time chart when the fuel cell is operated in a proper low-humidification operating condition that meets the following interrelations: Tcell<Tda and Tcell>Tdc.

Figure 9:
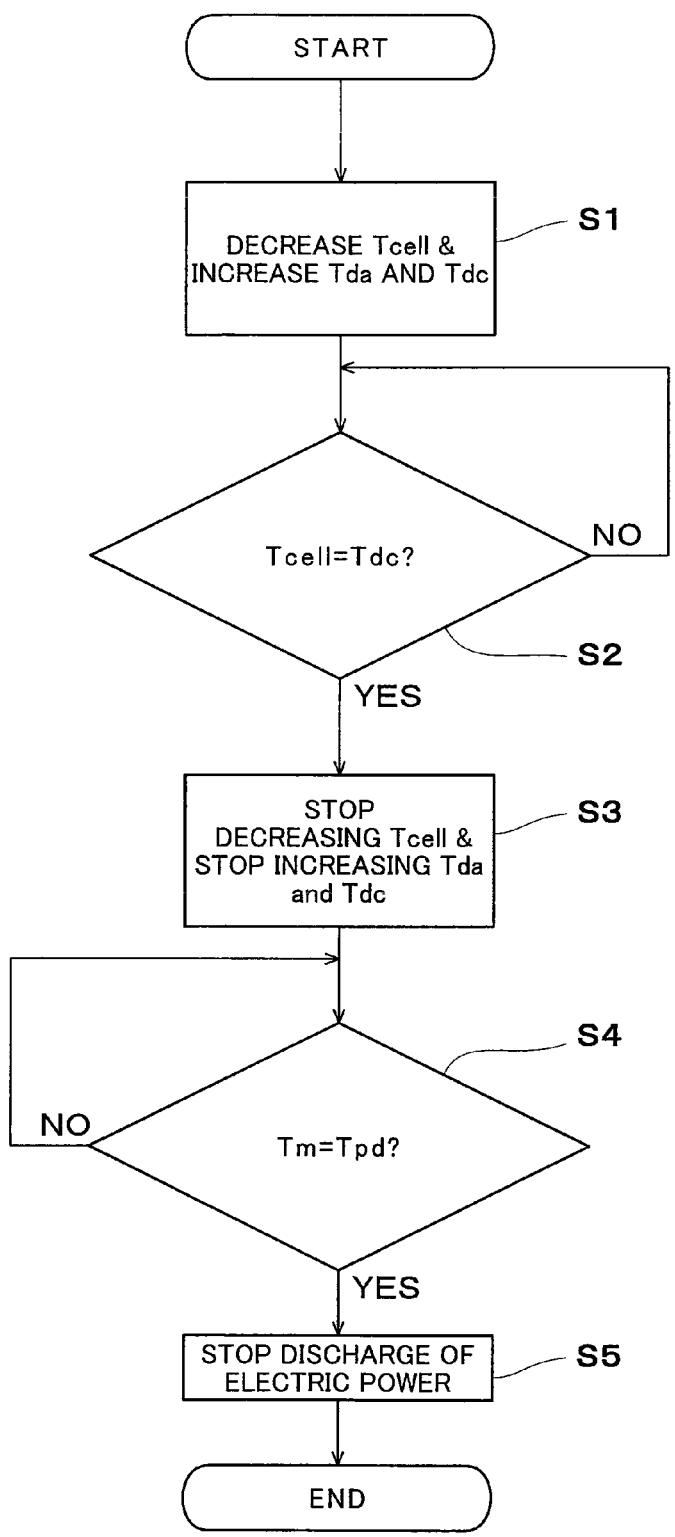
FIG. 9 is a flow chart schematically representing a characteristic operation of the fuel cell system according to the third embodiment of the present invention.

In addition, FIG. 9 is a flow chart schematically representing a characteristic operation of the fuel cell system according to the third embodiment of the present invention.

As shown in STATE 1~OPERATION 1~STATE 2 of FIGS. 8(a) and 8(b), when bringing the electric power generating operation of the fuel cell system 200 to a stop, in the state in which the electric power generating operation of the fuel cell 11 is being carried out in a proper low-humidification operating condition that meets the following interrelations: Tcell=Tda and Tcell>Tdc (STATE 1), the controller 20 first properly controls both the operation of the temperature controller 19 and the operation of the dew point controller 24 (OPERATION 1), thereby causing the temperature of the fuel cell 11 to decrease while causing the fuel gas dew point Tda and the oxidizing gas dew point Tdc to increase until the time that the oxidizing gas dew point Tdc and the temperature Tcell of the fuel cell 11 conform to each other (Step S1).

Next, while causing the fuel cell 11 to continue to discharge electric power, the controller 20 makes a decision of whether or not the oxidizing gas dew point Tdc and the temperature Tcell of the fuel cell 11 conform to each other on the basis of output signals from the dew point sensor 21c and the temperature sensor 22 (Step S2). And if the decision is that the oxidizing gas dew point Tdc and the temperature Tcell of the fuel cell 11 conform to each other ("YES" in Step S2), the controller 20 causes the temperature controller 19 and the dew point controller 24 to stop their respective control operation while causing the fuel cell 11 to continue to discharge electric power (OPERATION 2 and Step S3), and provides control that maintains the operation state of the fuel cell system 200 until the time that the measurement time Tm reaches the preset predetermined time Tpd (STATE 3).

And if the decision is that the measurement time Tm reaches the preset predetermined time Tpd ("YES" in Step S4), the controller 20 interrupts the electric connection between the fuel cell 11 and the external load (OPERATION 3) and causes the fuel cell 11 to stop discharging electric power (Step S5) to thereby place the fuel cell 11 in the open circuit state (STATE 4).

Furthermore, if decided that the oxidizing gas dew point Tdc and the temperature Tcell of the fuel cell 11 does not yet conform to each other ("NO" in Step S2), the controller 20 then continues control shown in Step S1 until the time that the oxidizing gas dew point Tdc and the temperature Tcell of the fuel cell 11 conform to each other while causing the fuel cell 11 to continue to discharge electric power. In addition, if decided that the measurement time Tm does not yet reach the preset predetermined time Tpd ("NO" in Step S4), the controller 20 provides control that further maintains the operating state of the fuel cell system 200 until the time that the measurement time Tm reaches the preset predetermined time Tpd while causing the fuel cell 11 to continue to discharge electric power.

In this way, when bringing the electric power generating operation of the fuel cell system 200 to a stop, the controller 20 controls both the temperature controller 19 and the dew point controller 24 to control both Tcell and Tdc, whereby it becomes possible to quickly bring the electric power generating operation of the fuel cell system 200 to a stop. Hereby, it becomes possible to provide a suitable fuel cell system having both excellent durability and convenience, and an operating method thereof.

The rest are the same as the first and the second embodiments.

Fourth Embodiment

The configuration of a fuel cell system according to a fourth embodiment of the present invention is identical with the configuration of the fuel cell system 100 according to the first embodiment as shown in FIG. 2. Therefore, a description regarding the configuration of the fuel cell system according to the present embodiment is omitted here.

Hereinafter, referring to FIGS. 2, 10, and 11, a description will be made of the operation of the fuel cell system according to the fourth embodiment of the present invention.

FIG. 10 is a time chart schematically representing variations in the fuel cell temperature Tcell, the fuel gas dew point Tda, the oxidizing gas dew point Tdc, and the fuel cell output voltage Vfc in a characteristic operation of the fuel cell system according to the fourth embodiment of the present invention. Furthermore, FIG. 10(a) is a time chart when the fuel cell is operated in a proper low-humidification operating condition that meets the following interrelations: Tcell=Tda and Tcell>Tdc. Furthermore, FIG. 10(b) is a time chart when the fuel cell is operated in a proper low-humidification operating condition that meets the following interrelation: Tcell<Tda and Tcell>Tdc.

Figure 11:
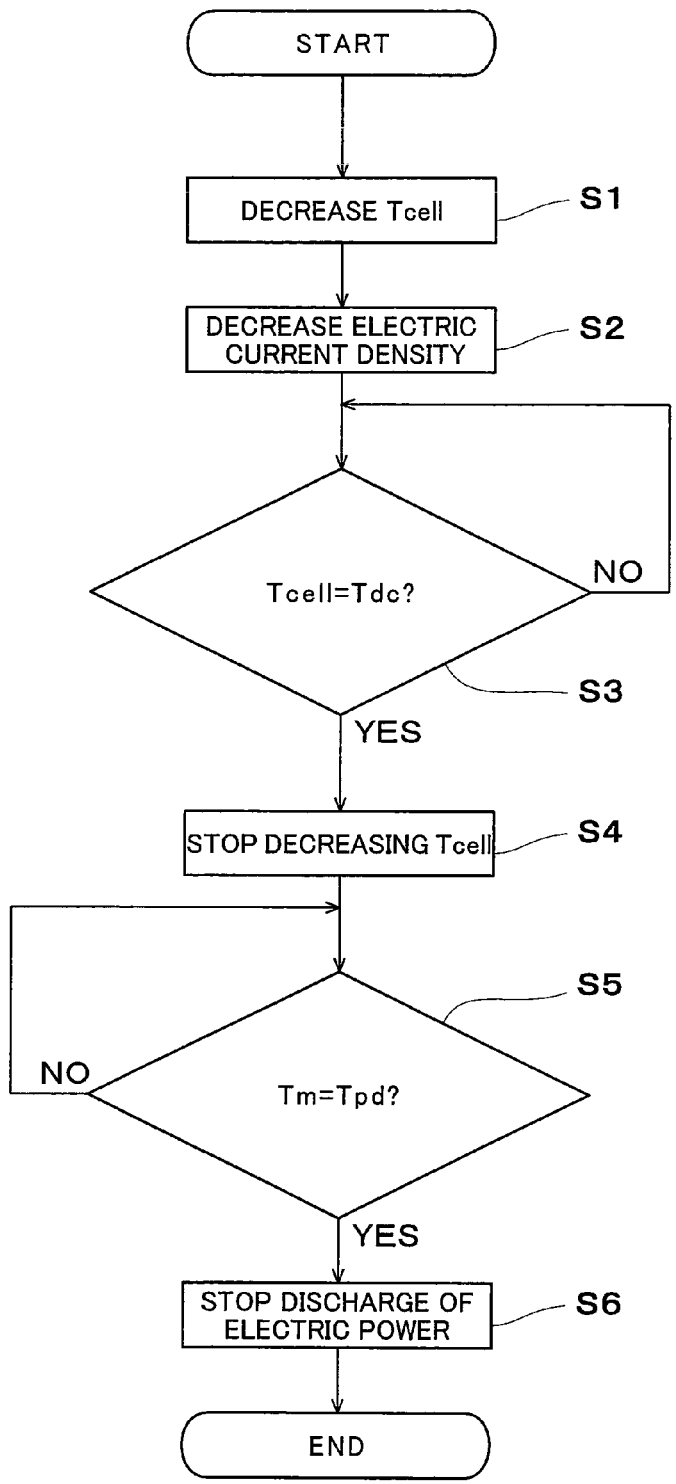
FIG. 11 is a flow chart schematically representing a characteristic operation of the fuel cell system according to the fourth embodiment of the present invention.

In addition, FIG. 11 is a flow chart schematically representing a characteristic operation of the fuel cell system according to the fourth embodiment of the present invention.

When bringing the electric power generation operation of the fuel cell system 100 to a stop, by controlling the operation of the temperature controller 19 (OPERATION 1) the controller 20 cause the temperature Tcell of the fuel cell 11 in operation in a proper low-humidification operating condition (STATE 1) to decrease until the time that the temperature Tcell of the fuel cell 11 conforms to the oxidizing gas dew point Tdc (Step S1 and STATE 1). At this point of time, in STATE 2 shown in FIGS. 10(a) and 10(b), the controller 20 causes the output electric current density during the discharge of electric power of the fuel cell 11 to drop to less than or equal to the output electric current density during the discharge of electric power in STATE 1 (Step S2 and OPERATION 2). By OPERATION 2 shown in FIGS. 10(a) and 10(b), the output voltage Vfc of the fuel cell 11 increases and the amount of generation of water generated associated with the generation of electric power in the fuel cell 11 decreases.

Subsequently, based on output signals from the dew point sensor 21c and the temperature sensor 22, the controller 20 of the fuel cell system 100 makes a decision of whether or not the temperature Tcell of the fuel cell 11 conforms to the oxidizing gas dew point Tdc (Step S3). And if the decision is that the temperature Tcell of the fuel cell 11 conforms to the oxidizing gas dew point Tdc ("YES" in Step S3), the controller 20 causes the temperature controller 19 to stop its cooling operation (Step S4 and OPERATION 3), and provides control that maintains the operation state of the fuel cell system 100 until the time that the measurement time Tm reaches the preset predetermined time Tpd (STATE 3). In STATE 3 as shown in FIGS. 10(a) and 10(b), the polymer electrolyte membrane of the fuel cell 11 is sufficiently humidified by water contained in the fuel gas and the oxidizing gas.

Next, the controller 20 makes a decision of whether or not the measurement time Tm reaches the preset predetermined time Tpd (Step S5).

And if the decision is that the measurement time Tm reaches the preset predetermined time Tpd ("YES" in Step S5), the controller 20 interrupts the electric connection between the fuel cell 11 and the external load and causes the fuel cell 11 to stop discharging electric power (Step S6 and OPERATION 4) to thereby place the fuel cell 11 in the open circuit state (STATE 4).

Thereafter, the controller 20 stops the operation of the fuel gas supplier 16 and the operation of the oxidizing gas supplier 17, performs a given process for preventing the polymer electrolyte membrane from becoming dried, and terminates all the operations relating to the electric power operation of the fuel cell system 100.

In this way, in the present embodiment, when bringing the electric power generating operation of the fuel cell 11 to a stop from the state in which the fuel cell 11 is being operated in a proper low-humidification operating condition, the controller 20 causes the temperature Tcell of the fuel cell to decrease and provides control that stops the discharge of electric power to the external load after the temperature Tcell of the fuel cell 11 conforms to the oxidizing gas dew point Tdc. At this point of time, during the time for which the temperature Tcell of the fuel cell 11 is decreased, the controller 20 causes the output electric current density during the discharge of electric power of the fuel cell 11 to decrease to less than or equal to the output electric current density during the electric power generating operation. Hereby, it becomes possible to reduce the amount of generation of water during the time for which the temperature Tcell of the fuel cell 11 is decreased, thereby making it possible to effectively prevent the passage from drain clog due to possible flooding occurring when the temperature Tcell of the fuel cell 11 is decreased.

In addition, in the fuel cell system, generally as the temperature of the fuel cell falls, the reaction resistance in the anode and that in the cathode increase. That is to say, in the fuel cell system, if the temperature of the fuel cell is decreased with the output electric current density during the discharge of electric power held constant, this causes a so-called polarity inversion phenomenon, in other words, the fuel cell output voltage becomes less than or equal to 0 volts. The occurrence of such a polarity inversion phenomenon will result in a substantial drop in the performance of the electric power generation of the fuel cell. However, in the present embodiment, the output electric current density of the fuel cell 11 during the discharge of electric power is decreased to less than or equal to the output electric current density during the electric power generating operation, when decreasing the temperature Tcell of the fuel cell 11, whereby it becomes possible to effectively prevent the fuel cell 11 from lapsing into the polarity inversion phenomenon. Hereby, it becomes possible to prevent the electric power generation performance of the fuel cell 11 from dropping.

The rest are the same as the first to third embodiments.

As described above, in accordance with the present invention, the fuel cell system is operated in a proper low-humidification operation, and when bringing its electric power generating operation to a stop, the polymer electrolyte membrane of the fuel cell is sufficiently positively humidified before the time that the fuel cell is electrically disconnected from the external load to be placed in the open circuit state, whereby it becomes possible to overcome the problem that the electric power generating performance of the fuel cell drops with time. This makes it possible to provide a fuel cell system capable of preventing the polymer electrolyte membrane from deterioration at the time when the polymer electrolyte fuel cell is shifted to the open circuit state and having excellent durability, and an operating method thereof.

Furthermore, it is preferred that the dew point of oxidizing gas will not vary with time in an embodiment in which the controller controls the temperature controller so that the fuel cell temperature and the oxidizing gas dew point conform to each other. The employment of such an embodiment makes it possible to reduce the length of standby time until the time that the fuel cell temperature and the oxidizing gas dew point conform to each other. A bubbler may be used as a humidifier of the dew point controller which prevents the dew point of oxidizing gas from varying with time. Here, the bubbler is a humidifier that effects humidification by the flow of oxidizing gas through heated water. In this bubbler, the oxidizing gas is humidified so as to have a dew point equal to the heated water temperature. Cooling medium for cooling the fuel cell, a heater, or combustion exhaust gas from the reformer may be used as a heat source to drive the bubbler. And by the use of the bubbler as a humidifier of the dew point controller, the oxidizing gas dew point is easily maintained constant. Hereby, the length of standby time until the time the fuel cell temperature and the oxidizing gas dew point conform to each other is easily reduced by a relatively simple configuration.

In addition, in each of the first to fourth embodiments of the present invention, there is shown by way of example an embodiment that meets the following interrelations: Tcell=Tda and Tcell>Tdc during the electric power generating operation of the fuel cell system where Tcell is the fuel cell temperature, Tda is the fuel gas dew point, and Tdc is the oxidizing gas dew point, but such an embodiment should not, however, be considered limitative. For example, the present invention is available in other than the case where the interrelations: Tcell=Tda and Tcell>Tdc are satisfied as exemplarily shown in the first to fourth embodiments, that is, the present invention is available also in the case where the interrelations: Tcell=Tdc and Tcell>Tda are satisfied.

INDUSTRIAL APPLICABILITY

The fuel cell system and the operating method thereof according to the present invention find their industrial utility as a fuel cell system (which ensures enough proton conductivity and enough energy conversion efficiency and, in addition, copes with an operating mode of the startup/shutdown type and which has excellent durability capable of effectively preventing the polymer electrolyte membrane from deterioration) and as an operating method of such a fuel cell system.

In addition, it is possible for the fuel cell system and the operating method thereof according to the present invention to find industrial utility in their application to, for example, the field of electric vehicle's motive electric power sources that are required to have a high output characteristic and to be started up in a short time and the field of cogeneration systems for household use that are required to have a long-term reliability.

The invention claimed is:

1. An operating method for a fuel cell system, the fuel cell system comprising:
   a fuel cell which generates electric power for a load using hydrogen-containing fuel gas and oxygen-containing oxidizing gas;
   a fuel gas supplier which supplies the fuel gas to the fuel cell; and
   an oxidizing gas supplier which supplies the oxidizing gas to the fuel cell,
   the fuel cell system operating method comprising steps of:
   generating the electric power by the fuel cell during an electric power generation period under a condition that one of a dew point of the fuel gas and a dew point of the oxidizing gas is higher than or equal to a temperature of the fuel cell and the other one of the dew point of the fuel gas and the dew point of the oxidizing gas is lower than the temperature of the fuel cell;
   when stopping the fuel cell system, causing the temperature of the fuel cell and the other one of the dew point of the fuel gas to be supplied to the fuel cell and the dew point of the oxidizing gas to be supplied to the fuel cell to be at least equal; and
   after the temperature of the fuel cell and the other one of the dew point of the fuel gas to be supplied to the fuel cell and the dew point of the oxidizing gas to be supplied to the fuel cell become at least equal, interrupting the electrical connection between the fuel cell and the load.

2. The fuel cell system operating method as set forth in claim 1, wherein the step of causing the temperature further comprises causing the other one of the dew point of the fuel gas to be supplied to the fuel cell and the dew point of the oxidizing gas to be supplied to the fuel cell to be higher than the temperature of the fuel cell.

3. The fuel cell system operating method as set forth in claim 1, wherein the step of causing the temperature comprises decreasing the temperature of fuel cell so that the temperature of fuel cell and the other one of the dew point of the fuel gas to be supplied to the fuel cell and the dew point of the oxidizing gas to be supplied to the fuel cell becomes equal.

4. The fuel cell system operating method as set forth in claim 1, wherein the step of causing the temperature comprises increasing the other one of the dew point of the fuel gas to be supplied to the fuel cell and the dew point of the oxidizing gas to be supplied to the fuel cell so that the temperature of the fuel cell and the other one of the dew point of the fuel gas to be supplied to the fuel cell and the dew point of the oxidizing gas to be supplied to the fuel cell becomes equal.

5. An operating method for a fuel cell system, the fuel cell system comprising:
   a fuel cell which generates electric power for a load using hydrogen-containing fuel gas and oxygen-containing oxidizing gas;
   a fuel gas supplier which supplies the fuel gas to the fuel cell; and
   an oxidizing gas supplier which supplies the oxidizing gas to the fuel cell;
   the fuel cell system operating method comprising steps of:
   generating the electric power by the fuel cell during an electric power generation period under a condition that one of a dew point of the fuel gas and a dew point of the oxidizing gas is higher than or equal to a temperature of the fuel cell and making the other dew point to be lower than the temperature of the fuel cell;
   when stopping the fuel cell system, causing the other one of the dew point of the fuel gas to be supplied to the fuel cell and the dew point of the oxidizing gas to be supplied to the fuel cell to become equal to or higher than the temperature of fuel cell; and thereafter
   after the other one of the dew point of the fuel gas to be supplied to the fuel cell and the dew point of the oxidizing gas to be supplied to the fuel cell becomes equal to or higher than the temperature of the fuel cell, interrupting the electrical connection between fuel cell and load.

6. The fuel cell system operating method as set forth in claim 5, the step of causing further comprises decreasing the temperature of the fuel cell so that the other one of the dew point of the fuel gas to be supplied to the fuel cell and the dew point of the oxidizing gas to be supplied to the fuel cell becomes equal to or higher than the temperature of the fuel cell.

7. The fuel cell system operating method as set forth in claim 6, further comprising a step of, when decreasing the temperature of the fuel cell, controlling an output electric current density of the fuel cell to be less than or equal to an output electric current density during the generation electric power period.

8. The fuel cell system operating method as set forth in claim 5, wherein the step of causing comprises increasing the other one of the dew point of the fuel gas to be supplied to the fuel cell and the dew point of the oxidizing gas to be supplied to the fuel cell so that the other one of the dew point of the fuel gas to be supplied to the fuel cell and the dew point of the oxidizing gas to be supplied to the fuel cell becomes equal to or higher than the temperature of the fuel cell.

9. The fuel cell system operating method as set forth in claim 8, further comprising a step of, when increasing the other one of the dew point of the fuel gas to be supplied to the fuel cell and the dew point of the oxidizing gas to be supplied to the fuel cell, controlling the output electric current density of the fuel cell to be less than or equal to that during the electric power generation period.

10. The fuel cell system operating method as set forth in claim 1, wherein, during the electric power generation period, the dew point of the fuel gas is higher than the dew point of the oxidizing gas, and the dew point of the fuel gas is higher than or equal to the temperature of the fuel cell and the dew point of the oxidizing gas is lower than the temperature of the fuel cell.

11. The fuel cell system operating method as set forth in claim 5, wherein, during the electric power generation period, the dew point of the fuel gas is higher than the dew point of the oxidizing gas, and the dew point of the fuel gas is higher than or equal to the temperature of the fuel cell and the dew point of the oxidizing gas is lower than the temperature of the fuel cell.

* * * * *